United States Patent
Okura et al.

(10) Patent No.: US 10,619,084 B2
(45) Date of Patent: Apr. 14, 2020

(54) PLUG FOR WELL DRILLING PROVIDED WITH DIAMETRICALLY EXPANDABLE ANNULAR RUBBER MEMBER FORMED FROM DEGRADABLE RUBBER MATERIAL

(71) Applicant: Kureha Corporation, Tokyo (JP)

(72) Inventors: Masayuki Okura, Tokyo (JP); Takeo Takahashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 120 days.

(21) Appl. No.: 15/039,186

(22) PCT Filed: Dec. 22, 2014

(86) PCT No.: PCT/JP2014/083926
§ 371 (c)(1),
(2) Date: May 25, 2016

(87) PCT Pub. No.: WO2015/098849
PCT Pub. Date: Jul. 2, 2015

(65) Prior Publication Data
US 2017/0158942 A1    Jun. 8, 2017

(30) Foreign Application Priority Data

Dec. 27, 2013  (JP) .................. 2013-271309
Jun. 22, 2014  (JP) .................. 2014-127781

(51) Int. Cl.
*E21B 33/12*    (2006.01)
*C09K 8/42*     (2006.01)
*E21B 33/128*   (2006.01)

(52) U.S. Cl.
CPC ............ *C09K 8/426* (2013.01); *E21B 33/128* (2013.01); *E21B 33/1208* (2013.01)

(58) Field of Classification Search
CPC .... E21B 33/12; E21B 33/1204; E21B 33/128; E21B 33/1208; E21B 33/1285;
(Continued)

(56) References Cited

U.S. PATENT DOCUMENTS 7,353,879 B2    4/2008   Todd et al.
8,336,616 B1   12/2012   McClinton
(Continued)

FOREIGN PATENT DOCUMENTS

CN    202181896 U    4/2012
JP    2003533619 A   11/2003
(Continued)

OTHER PUBLICATIONS

*Redwood Plastics Polyether* vs *Polyester* accessed 2019 https://web.archive.org/web/20150303044239/http://www.redwoodplastics.com/polyurethane/polyether-vs-polyester/ (Year: 2015).*
(Continued)

*Primary Examiner* — David Carroll
(74) *Attorney, Agent, or Firm* — Birch, Stewart, Kolasch & Birch, LLP

(57) ABSTRACT

A plug for well drilling includes a mandrel and at least one diametrically expandable annular rubber member and at least one slip disposed on an outer circumferential surface orthogonal to an axial direction of the mandrel; (i) the mandrel being formed from a degradable material; and (ii) the at least one diametrically expandable annular rubber member being formed from a degradable rubber material having a rate of decrease of not less than 5% in 50% strain compressive stress after immersion in water at a temperature of 150° C. for 24 hours relative to the compressive stress before immersion; and/or having a rate of loss of mass of from 5 to 100% after immersion in water at a temperature of 150° C. for 72 hours relative to the mass before immersion.

(Continued)

A well drilling method includes a step of isolating a borehole using the plug for well drilling, part or all of the plug being degraded thereafter.

17 Claims, 1 Drawing Sheet

(58) Field of Classification Search
CPC .............. E21B 33/129; E21B 33/1291; E21B 33/1292; E21B 33/1293; E21B 33/134
See application file for complete search history.

(56) References Cited

U.S. PATENT DOCUMENTS

| | | |
|---|---|---|
| 2003/0060375 A1 | 3/2003 | Grainger et al. |
| 2005/0205266 A1 | 9/2005 | Todd et al. |
| 2007/0169935 A1 | 7/2007 | Akbar et al. |
| 2007/0277979 A1 | 12/2007 | Todd et al. |
| 2009/0242214 A1 | 10/2009 | Foster et al. |
| 2011/0067889 A1* | 3/2011 | Marya .................. E21B 33/134 166/386 |
| 2011/0277989 A1 | 11/2011 | Frazier |
| 2011/0278011 A1 | 11/2011 | Crainich, Jr. et al. |
| 2013/0183363 A1 | 7/2013 | Polaschegg |
| 2013/0240200 A1 | 9/2013 | Frazier |
| 2013/0240203 A1* | 9/2013 | Frazier .................. E21B 33/129 166/193 |
| 2013/0292123 A1 | 11/2013 | Murphree et al. |
| 2014/0076571 A1 | 3/2014 | Frazier et al. |
| 2014/0190685 A1 | 7/2014 | Frazier et al. |
| 2015/0096741 A1 | 4/2015 | Okura et al. |
| 2015/0126414 A1 | 5/2015 | Abe et al. |

FOREIGN PATENT DOCUMENTS

| | | |
|---|---|---|
| WO | WO 2013/161755 A1 | 10/2013 |
| WO | WO 2013-183363 A1 | 12/2013 |

OTHER PUBLICATIONS

Huntsman A guide to Thermoplastic Polyurethanes (TPU) No listed publication date—Metadate shows PDF created in 2010 http://www.huntsman.com/polyurethanes/Media%20Library/global/files/guide_tpu.pdf (Year: 2019).*

International Search Report of PCT/JP2014/083926 dated Mar. 31, 2015.

Chinese Office Action and Search Report, dated Feb. 24, 2017, for counterpart Chinese Application No. 201480053505.2, with an English translation.

Office Action dated Mar. 27, 2017, in Canadian Patent Application No. 2,931,498.

Notification of Reasons for Rejection dated Jan. 9, 2018, in Japanese Patent Application No. 2014-127781, with English translation.

Second Office Action dated Oct. 23, 2017, in Chinese Patent Application No. 201480053505.2, with English translation.

English translation of International Preliminary Report on Patentability and Written Opinion dated Jul. 7, 2016, in PCT International Application No. PCT/JP2014/083926.

Extended European Search Report dated Nov. 28, 2016, in European Patent Application No. 14875458.3.

Communication Pursuant to Rule 114(2) EPC dated Aug. 22, 2018, in European Patent Application No. 14875458.3.

* cited by examiner

PLUG FOR WELL DRILLING PROVIDED WITH DIAMETRICALLY EXPANDABLE ANNULAR RUBBER MEMBER FORMED FROM DEGRADABLE RUBBER MATERIAL

TECHNICAL FIELD

The present invention relates to a plug for well drilling used in well drilling performed to produce hydrocarbon resources such as petroleum or natural gas, and a well drilling method.

BACKGROUND ART

Hydrocarbon resources such as petroleum or natural gas have come to be produced by excavation through wells (oil wells or gas wells, also collectively called "wells") having a porous and permeable subterranean formation. As energy consumption increases, deeper wells are being drilled, reaching depths greater than 9000 m worldwide and greater than 6000 m in Japan. In wells that are continuously excavated, the productive layer is stimulated in order to continuously excavate hydrocarbon resources efficiently from subterranean formations of which permeability has decreased over time and subterranean formations of which permeability is insufficient from the beginning. Known stimulation methods include acid treatment and fracturing (Patent Document 1). Acid treatment is a method in which the permeability of the productive layer is increased by injecting a mixture of strong acids such as hydrochloric acid or hydrogen fluoride into the productive layer and dissolving the reaction components of bedrock (carbonates, clay minerals, silicates, and the like). However, various problems that accompany the use of strong acids have been identified, and increased costs, including various countermeasures, have also been pointed out. Thus, methods of forming fractures in the productive layer using fluid pressure (also called "fracturing" or "hydraulic fracturing") have received attention.

Hydraulic fracturing is a method in which fractures are generated in the productive layer by fluid pressure such as water pressure (also simply called "hydraulic pressure" hereinafter). Generally, a vertical hole is drilled, and then the vertical hole is curved and a horizontal hole is drilled in a subterranean formation several thousand meters underground. Fracturing fluid is then fed into these boreholes (meaning holes provided for forming a well, also called "downholes") at high pressure, and fractures are produced by the hydraulic pressure in the deep subterranean productive layer (layer that produces the hydrocarbon resource such as petroleum or natural gas), and the productive layer is thereby stimulated in order to extract the hydrocarbon resource through the fractures. The efficacy of hydraulic fracturing has also been examined for the development of unconventional resources such as so-called shale oil (oil that matures in shale) and shale gas.

Fractures formed by fluid pressure such as water pressure immediately close due to formation pressure when the hydraulic pressure is no longer applied. To prevent a fracture from closing, a proppant is included in the fracturing fluid (that is, the well treatment fluid used in fracturing), which is fed into the borehole, thereby distributing the proppant in the fracture. Inorganic or organic materials are used as proppants included in fracturing fluid, but silica, alumina, and other inorganic particles have been conventionally used, and sand particles such as 20/40-mesh sand have been widely used because they are capable of preventing fracture closure in a very deep subterranean environment under high-temperature and high-pressure for a long time.

Various types of water-based, oil-based, and emulsion-based fluids are used as well treatment fluids such as fracturing fluid. Because the well treatment fluid must have the function of transporting the proppant to the location where the fracture is generated in the borehole, it generally must have a prescribed viscosity, good proppant dispersibility, ease of after-treatment, and low environmental load. Furthermore, fracturing fluid sometimes contains a channelant in order to form flow paths through which shale oil, shale gas, and the like can pass among the proppant. Accordingly, in addition to the proppant, various additives are used in well treatment fluid, such as channelants, gelling agents, antiscale agents, acids for dissolving rock and the like, friction-reducing agents, and the like.

The following method is typically used to produce fractures by hydraulic pressure in the productive layer of a deep subterranean formation (layer that produces the hydrocarbon resource such a petroleum such as shale oil or natural gas such as shale gas) using a fluid. Specifically, a prescribed section of a borehole (downhole) drilled in a subterranean formation several thousand meters deep is partially plugged while isolating sequentially from the tip portion of the borehole, and fracturing is performed by feeding fracturing fluid in at high pressure into the plugged section to produce fractures in the productive layer. Then, the next prescribed section (typically ahead of the preceding section, i.e., a segment closer to the ground surface) is plugged, and fracturing is performed. After that, this process is repeated until the required isolation and fracturing have been completed.

Stimulation of the productive layer by fracturing is sometimes also performed again not only for the drilling of new wells, but also for desired sections of boreholes that have already been formed. In this case as well, the operations of borehole plugging, fracturing, and the like are similarly repeated. Additionally, there are also cases where, to perform finishing of the well, the borehole is plugged to block fluid from below, and after finishing of the top portions thereof is performed, the plugging is released.

Various methods are known for plugging and fracturing of boreholes, and Patent Documents 2 and 3, for example, disclose plugs that can plug or fix a borehole (also called a "frac plug," "bridge plug," "packer," or the like).

Patent Document 2 discloses a downhole plug for well drilling (also called a "plug for well drilling" or simply a"plug" hereinafter), and specifically discloses a plug comprising a mandrel (main body) having a hollow part in the axial direction, a ring or annular member along the axial direction on the outer circumferential surface orthogonal to the axial direction of the mandrel, a first conical member and slip, a malleable element formed from an elastomer, rubber, or the like, a second conical member and slip, and an anti-rotation feature. The plugging of the borehole by this plug for well drilling is performed as follows. Specifically, by moving the mandrel in the axial direction thereof, as the gap between the ring or annular member and the anti-rotation feature gets smaller, the slip contacts the slanted face of the conical member, and by proceeding along the conical member, it moves so as to expand radially, and the tip of the slip then contacts the inside wall of the borehole and is fixed in the borehole to seal the borehole, while the malleable element deforms by diametric expansion, contacts the inside wall of the borehole, and plugs the borehole as the distance in the axial direction of the mandrel decreases. It is described that metal materials (aluminum, steel, stainless steel, and the like), fibers, wood, composite materials, plastics, and the like are widely exemplified as materials that form plugs, and that composite materials containing a reinforcing material such as carbon fibers, especially polymer composite materials of epoxy resin, phenol resin, and the like, are preferred, and that the mandrel is formed from aluminum or a composite material.

Borehole plugs are arranged sequentially inside the borehole until the borehole is completed, but at the stage when the production of petroleum such as shale oil or natural gas such as shale gas (also collectively called "petroleum or natural gas" hereafter) is begun, it is necessary to release the plugging of the borehole by the slip and the diametrically expandable annular rubber member, which are members of the plug for well drilling, and to remove the plug. Because the plug is typically not designed to be retrievable after use and the release of plugging, it is removed by destruction or by making it into small fragments by pulverization, perforation, or another method, but substantial cost and time are required for pulverization, perforation, and the like. There are also plugs specially designed to be retrievable after use (retrievable plugs), but since plugs are placed deep underground, substantial cost and time are required to retrieve all of them.

Patent Document 3 discloses a disposable downhole tool (meaning a downhole plug or the like) or a member thereof containing a biodegradable material that degrades when exposed to the environment inside a well, and as the biodegradable material, discloses a degradable polymer such as an aliphatic polyester such as polylactic acid. Additionally, Patent Document 3 describes a combination of a tubular body element having an axial-direction flow bore, a packer element assembly comprising an upper sealing element, a center sealing element, and a lower sealing element along the axial direction on the outer circumferential surface orthogonal to the axial direction of the tubular body element, a slip, and a mechanical slip body. Furthermore, Patent Document 3 discloses that fluid flow in only one direction is allowed due to the fact that a ball is set in the flow bore of the cylindrical body part. However, Patent Document 3 does not disclose whether a material containing a biodegradable material is used for a downhole tool or any member thereof.

Due to increased demand for the securement of energy resources, environmental protection, and the like, particularly as excavation of unconventional resources expands, excavation conditions are becoming increasingly harsh, such as increased depth. There is a demand for a plug for well drilling with which borehole plugging and fracturing can be performed reliably, and with which the cost of well drilling can be reduced and the process can be shortened by facilitating the removal of the plug or the securement of a flow path. Therefore, various attempts have been made by trial and error within the limitations of the functional material of the plug for well drilling with regard to the selection or compositional optimization of materials having optimal mechanical characteristics or the like, to optimization of the shape such as thickness of the member forming the plugs, and to combinations of members, and the like, but a plug which sufficiently satisfies these requirements has not yet been found.

CITATION LIST

Patent Literature

Patent Document 1: Japanese Unexamined Patent Application Publication (Translation of PCT Application) No. 2003-533619A (corresponding to WO/01/088333)

Patent Document 2: US Patent Application Publication No. 2011/0277989 A1 specification Patent Document 3: US Patent Application Publication No. 2005/0205266 A1 specification

SUMMARY OF INVENTION

Technical Problem

An object of the present invention is to provide a plug for well drilling with which, under increasingly harsh excavation conditions such as increased depth, borehole plugging and fracturing can be performed reliably, and with which the cost of well drilling can be reduced and the process can be shortened by facilitating the removal of the plug or the securement of a flow path. Another object of the present invention is to provide a well drilling method using the plug for well drilling described above.

Solution to Problem

As a result of conducting dedicated research in order to solve the problems described above, the present inventors discovered that the problems can be solved by, in a plug for well drilling in which at least one diametrically expandable annular rubber member and at least one slip are disposed on the outer circumferential surface orthogonal to the axial direction of a mandrel, forming the mandrel and the at least one diametrically expandable annular rubber member from specific materials, and the present inventors thereby completed the present invention.

That is, one aspect of the present invention provides (1) a plug for well drilling comprising a mandrel and at least one diametrically expandable annular rubber member and at least one slip, the at least one diametrically expandable annular rubber member and the at least one slip being disposed on an outer circumferential surface orthogonal to an axial direction of the mandrel;
(i) the mandrel being formed from a degradable material; and
(ii) the at least one diametrically expandable annular rubber member being formed from a degradable rubber material having a rate of decrease of not less than 5% in 50% strain compressive stress after immersion in water at a temperature of 150° C. for 24 hours relative to a 50% strain compressive stress before immersion.
As a specific mode of the invention, the present invention provides (2) the plug for well drilling according to (1) above, wherein (ii') the at least one diametrically expandable annular rubber member is formed from a degradable rubber material having a rate of loss of mass of from 5 to 100% after immersion in water at a temperature of 150° C. for 72 hours relative to a mass before immersion.

Another aspect of the present invention provides (3) a plug for well drilling comprising a mandrel and at least one diametrically expandable annular rubber member and at least one slip, the at least one diametrically expandable annular rubber member and the at least one slip being disposed on an outer circumferential surface orthogonal to an axial direction of the mandrel;
(i) the mandrel being formed from a degradable material; and
(ii') the at least one diametrically expandable annular rubber member being formed from a degradable rubber material having a rate of loss of mass of from 5 to 100% after immersion in water at a temperature of 150° C. for 72 hours with respect to a mass before immersion.

In addition, the present invention provides the plugs for well drilling of (4) to (22) below as specific modes of the invention.

(4) The plug for well drilling according to any one of (1) to (3) above, wherein the at least one diametrically expandable annular rubber member is formed from a degradable rubber material having a tensile fracture strain of not less than 50% at a temperature of 66° C., a 70% strain compressive stress of not less than 10 MPa, and a compressive fracture strain of not less than 50%.

(5) The plug for well drilling according to (4) above, wherein the at least one diametrically expandable annular rubber member has a hardness within the range of A60 to D80.

(6) The plug for well drilling according to any one of (1) to (5) above, wherein the at least one diametrically expandable annular rubber member is stable in a dry environment, and a rate of decrease in 50% strain compressive stress after immersion for 6 hours in water at a temperature of 23° C. relative to a 50% strain compressive stress after immersion for 1 hour is less than 5%.

(7) The plug for well drilling according to any one of (1) to (6) above, wherein a ratio of compressive stress at 70% compressive strain relative to a compressive stress at 5% compressive strain at a temperature of 66° C. is not less than 5.

(8) The plug for well drilling according to any one of (1) to (7) above, wherein the mandrel is formed from a degradable material having a shearing stress of not less than 30 MPa at a temperature of 66° C.

(9) The plug for well drilling according to any one of (1) to (8) above, wherein the mandrel has a decrease in thickness of less than 5 mm after immersion in water at a temperature of 66° C. for 1 hour, and a decrease in thickness of not less than 10 mm after immersion in water at a temperature of 149° C. for 24 hours.

(10) The plug for well drilling according to any one of (1) to (9) above, wherein the mandrel has a tensile load capacity of not less than 5 kN at a temperature of 66° C.

(11) The plug for well drilling according to any one of (1) to (10) above, wherein the mandrel is formed from a composite material containing a degradable material.

(12) The plug for well drilling according to any one of (1) to (11) above, wherein the degradable rubber material contains at least one type selected from the group consisting of urethane rubber, natural rubber, isoprene rubber, ethylene propylene rubber, butyl rubber, styrene rubber, acrylic rubber, aliphatic polyester rubber, chloroprene rubber, polyester-based thermoplastic elastomer, and polyamide-based thermoplastic elastomer.

(13) The plug for well drilling according to any one of (1) to (12) above, wherein the degradable rubber material contains a rubber having a hydrolyzable functional group.

(14) The plug for well drilling according to any one of (1) to (13) above, wherein the degradable rubber material contains a rubber having at least one bond comprising a urethane bond, an ester bond, or an amide bond.

(15) The plug for well drilling according to any one of (1) to (14) above, wherein the degradable rubber material contains at least one type selected from the group consisting of urethane rubber, polyester-based thermoplastic elastomer, and polyamide-based thermoplastic elastomer.

(16) The plug for well drilling according to any one of (1) to (15) above, wherein the degradable material contains an aliphatic polyester.

(17) The plug for well drilling according to (16) above, wherein the aliphatic polyester is a polyglycolic acid.

(18) The plug for well drilling according to (17) above, wherein the polyglycolic acid has a weight average molecular weight of from 180,000 to 300,000 and a melt viscosity of from 700 to 2000 Pa·s when measured at a temperature of 270° C. and a shear rate of 122 $sec^{-1}$.

(19) The plug for well drilling according to any one of (1) to (18) above, wherein the degradable material and/or the degradable rubber material contains a reinforcing material.

(20) The plug for well drilling according to any one of (1) to (19) above having at least one structure represented by a) to d) below:

a) the mandrel has a hollow part along the axial direction in at least a part thereof or does not have a hollow part along the axial direction;

b) the plug comprises a plurality of diametrically expandable annular rubber members formed from degradable rubber materials;

c) the plug comprises at least one wedge disposed on the outer circumferential surface orthogonal to the axial direction of the mandrel; or d) the plug comprises a pair of rings disposed on the outer circumferential surface orthogonal to the axial direction of the mandrel, and the at least one diametrically expandable annular rubber member formed from a degradable rubber material is provided between the pair of rings.

(21) The plug for well drilling according to any one of (1) to (20) above, wherein in a well treatment fluid, a difference between a time required for a thickness of a member formed from a degradable material to reach 0 and a time required for the rate of decrease in the 50% strain compressive stress of the diametrically expandable annular rubber member formed from a degradable rubber material after immersion in water at a temperature of 150° C. for 24 hours relative to the 50% strain compressive stress before immersion to be not less than 50% is not less than 0 hours and not more than 2 weeks.

(22) The plug for well drilling according to (21) above, wherein the member formed from a degradable material is a mandrel.

(23) Further, another aspect of the present invention provides a well drilling method comprising a step of isolating a borehole using the plug for well drilling described in any one of (1) to (22) above, part or all of the plug for well drilling being degraded thereafter.

Advantageous Effects of Invention

The present invention provides a plug for well drilling comprising a mandrel and at least one diametrically expandable annular rubber member and at least one slip disposed on an outer circumferential surface orthogonal to an axial direction of the mandrel; (i) the mandrel being formed from a degradable material; and (ii) the at least one diametrically expandable annular rubber member being formed from a degradable rubber material having a rate of decrease of not less than 5% in 50% strain compressive stress after immersion in water at a temperature of 150° C. for 24 hours relative to a 50% strain compressive stress before immersion; and/or (ii') the at least one diametrically expandable annular rubber member being formed from a degradable rubber material having a rate of loss of mass of from 5 to 100% after immersion in water at a temperature of 150° C. for 72 hours relative to a mass before immersion. This yields the effect that borehole plugging and fracturing can be performed reliably, under increasingly harsh excavation conditions such as increased depth, and the cost of well drilling can be reduced and the process can be shortened by facilitating the removal of the plug or the securement of a flow path.

In addition, the present invention provides a well drilling method comprising isolating a borehole using the plug for well drilling described above, part or all of the plug for well drilling being degraded thereafter. This yields the effect of providing a well drilling method with which borehole plugging and fracturing can be performed reliably, and with which the cost of well drilling can be reduced and the process can be shortened by facilitating the removal of the plug or the securement of a flow path.

DESCRIPTION OF EMBODIMENTS

I. Plug for Well Drilling

Figure 1A:
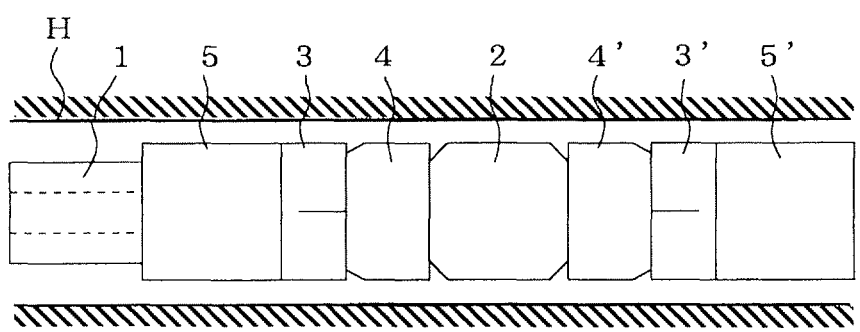
FIG. 1A is a schematic diagram illustrating a specific example of the plug for well drilling of the present invention.

The present invention is a plug for well drilling comprising a mandrel and at least one diametrically expandable annular rubber member and at least one slip, the at least one diametrically expandable annular rubber member and the at least one slip being disposed on an outer circumferential surface orthogonal to an axial direction of the mandrel; (i) the mandrel being formed from a degradable material; and (ii) the at least one diametrically expandable annular rubber member being formed from a degradable rubber material having a rate of decrease of not less than 5% in 50% strain compressive stress after immersion in water at a temperature of 150° C. for 24 hours relative to a 50% strain compressive stress before immersion; and/or (ii') the at least one diametrically expandable annular rubber member being formed from a degradable rubber material having a rate of loss of mass of from 5 to 100% after immersion in water at a temperature of 150° C. for 72 hours relative to a mass before immersion. This will be described with reference to the drawings hereinafter.

1. Mandrel

The plug for well drilling of the present invention is characterized by comprising a mandrel 1 formed from a degradable material. The mandrel 1 provided in the plug for well drilling of the present invention is normally called a "core metal," of which the cross-section has a substantially circular shape, and the length is sufficiently long relative to the diameter of the cross-section so as to basically ensure the strength of the plug for well drilling of the present invention. In the mandrel 1 provided in the plug for well drilling of the present invention, the diameter of the cross-section is selected as appropriate according to the size of the borehole (by making it smaller than the inside diameter of the borehole, the plug can move inside the borehole, while on the other hand, as will be described later, the mandrel has a diameter of a degree that enables borehole plugging by expanding the diameter of a diametrically expandable annular rubber member 2 attached to the outer circumferential surface of the mandrel 1, expanding the diameter of a slip 3, or the like). The length of the mandrel 1 is, for example, approximately 5 to 20 times the diameter of the cross-section but is not limited thereto. The diameter of the cross-section of the mandrel 1 is typically in the range of approximately 5 to approximately 30 cm.

[Hollow Part]

The mandrel 1 provided in the plug for well drilling of the present invention may be one having a hollow part along the axial direction in at least a part thereof or may be a solid mandrel not having a hollow part along the axial direction, but the mandrel 1 is preferably a hollow mandrel having a hollow part along the axial direction in at least a part thereof from the perspectives of securing a flow path at the early stage of fracturing, the reduction of the weight of the mandrel 1, and the control of the degradation rate of the mandrel 1. The hollow part may be configured so as to penetrate the mandrel 1 along the axial direction or to not penetrate the mandrel 1 along the axial direction. When the plug for well drilling is pressed into a borehole using a fluid, the mandrel 1 must have a hollow part along the axial direction. When the mandrel 1 has a hollow part along the axial direction, the cross-sectional shape of the mandrel 1 is a circular shape formed by two concentric circles forming the diameter (outside diameter) of the mandrel 1 and the outside diameter of the hollow part (corresponding to the inside diameter of the mandrel 1). The ratio of the diameters of the two concentric circles—that is, the ratio of the outside diameter of the hollow part to the diameter of the mandrel 1—is preferably not more than 0.7. The magnitude of this ratio has a reciprocal relationship with the magnitude of the ratio of the thickness of the hollow mandrel to the diameter of the mandrel 1, so determining the upper limit of this ratio can be considered equivalent to determining a preferable lower limit of the thickness of the hollow mandrel. When the thickness of the hollow mandrel is too thin, the strength (in particular, the tensile strength) of the hollow mandrel may be insufficient when the plug for well drilling is placed inside a borehole or at the time of borehole plugging or fracturing, which may damage the plug for well drilling in extreme cases. Therefore, the ratio of the outside diameter of the hollow part to the diameter of the mandrel 1 is more preferably not more than 0.6 and even more preferably not more than 0.5.

The diameter of the mandrel 1 and/or the outside diameter of the hollow part may be uniform along the axial direction of the mandrel 1, but may also vary along the axial direction. That is, convex parts, stepped parts, concave parts (grooves), or the like may be formed on the outer circumferential surface of the mandrel 1 due to the fact that the outside diameter of the mandrel 1 varies along the axial direction. In addition, convex parts, stepped parts, concave parts (grooves), or the like may be formed on the inner peripheral surface of the mandrel 1 when the outside diameter of the hollow part varies along the axial direction. The convex parts, stepped parts, or concave parts (grooves) on the outer circumferential surface and/or the inner circumferential surface of the mandrel 1 may be used as sites for attaching or fixing other members to the outer circumferential surface and/or the inner circumferential surface of the mandrel 1, and in particular, as will be described later, the convex parts, stepped parts, or concave parts (grooves) may serve as fixing parts for fixing a diametrically expandable annular rubber member 2. Also, when the mandrel 1 has a hollow part, it may have a seat for holding a ball used to control the flow of fluid.

[Degradable Material]

The mandrel 1 provided in the plug for well drilling of the present invention is formed from a degradable material. The degradable material may be a degradable material that is, for example, biodegradable, meaning that it is degraded by microorganisms in the soil in which the fracturing fluid is used, or hydrolyzable, meaning that it is degraded by a solvent in the fracturing fluid, particularly by water, and also by acids or alkalis if desired. Additionally, it may be a degradable material that can be degraded chemically by some other method. Preferably, it is a hydrolyzable material degraded by water of not less than a prescribed temperature. Materials which physically lose their shape by destruction, disintegration, or the like when a large mechanical force is applied, as in the case of a metal material such as aluminum widely used as mandrels provided in conventional plugs for well drilling, do not qualify as degradable materials for forming the mandrel 1 provided in the plug for well drilling of the present invention. However, materials in which the intrinsic strength of resin decreases and the resin becomes weak due to a reduction in the degree of polymerization or the like, resulting in it disintegrating and losing its original shape (also called "disintegrability" hereinafter) when a very small mechanical force is applied, also qualify as the degradable materials described above.

A degradable resin is preferred as the degradable material that forms the mandrel 1 provided in the plug for well drilling of the present invention because it must have the strength expected for a material used in a high-temperature, high-pressure deep subterranean environment while also having excellent degradability. A degradable resin refers to a resin that is biodegradable, hydrolyzable, or can be further degraded chemically by another method, as described above. Examples of the degradable resin include aliphatic polyesters such as polylactic acid, polyglycolic acid, and poly-ε-caprolactone, and polyvinyl alcohols (partially saponified polyvinyl alcohols and the like having a degree of saponification of 80 to 95 mol %), but it is more preferably an aliphatic polyester. That is, the degradable material is preferably an aliphatic polyester. The degradable resin may be one type alone or a combination obtained by blending two or more types.

[Aliphatic Polyester]

The aliphatic polyester is, for example, an aliphatic polyester obtained by the homopolymerization or copolymerization of an oxycarboxylic acid and/or a lactone, an esterification reaction between an aliphatic dicarboxylic acid and an aliphatic diol, or the copolymerization of an aliphatic dicarboxylic acid, an aliphatic diol, an oxycarboxylic acid, and/or a lactone, and a substance which dissolves rapidly in water at a temperature of from approximately 20 to approximately 100° C. is preferable.

Examples of oxycarboxylic acids include aliphatic hydroxycarboxylic acids having from 2 to 8 carbon atoms such as glycolic acid, lactic acid, malic acid, hydroxypropionic acid, hydroxybutyric acid, hydroxypentanoic acid, hydroxycaproic acid, hydroxyheptanoic acid, and hydroxyoctanoic acid. Examples of lactones include lactones having from 3 to 10 carbon atoms such as propiolactone, butyrolactone, valerolactone, and ε-caprolactone.

Examples of aliphatic dicarboxylic acids include aliphatic saturated dicarboxylic acids having from 2 to 8 carbon atoms such as oxalic acid, malonic acid, succinic acid, glutaric acid, and adipic acid, and aliphatic unsaturated dicarboxylic acids having from 4 to 8 carbon atoms such as maleic acid and fumaric acid. Examples of aliphatic diols include alkylene glycols having from 2 to 6 carbon atoms such as ethylene glycol, propylene glycol, butanediol, and hexanediol, and polyalkylene glycols having from 2 to 4 carbon atoms such as polyethylene glycol, polypropylene glycol, and polybutylene glycol.

The components forming these polyesters may be each used alone or in combinations of two or more types. Furthermore, components that form an aromatic polyester such as terephthalic acid may be used in combination provided that the properties as a degradable resin are not lost.

Examples of particularly preferable aliphatic polyesters include hydroxycarboxylic acid-based aliphatic polyesters such as polylactic acid (also called "PLA" hereafter) or polyglycolic acid (also called "PGA" hereafter); lactone-based aliphatic polyesters such as poly-ε-caprolactone; diol/dicarboxylic acid-based aliphatic polyesters such as polyethylene succinate or polybutylene succinate; copolymers thereof such as glycolic acid/lactic acid copolymers (also called "PGLA" hereafter); and mixtures thereof. In addition, aliphatic polyesters in which aromatic components such as polyethylene adipate/terephthalate are used in combination may also be used.

From the perspective of the strength and degradability required of the mandrel 1 provided in the plug for well drilling, the aliphatic polyester is most preferably at least one type selected from the group consisting of PGA, PLA, and PGLA, and PGA is even more preferable. The PGA encompasses not only homopolymers of glycolic acid, but also copolymers containing not less than 50 mass %, preferably not less than 75 mass %, more preferably not less than 85 mass %, even more preferably not less than 90 mass %, particularly preferably not less than 95 mass %, most preferably not less than 99 mass %, and above all, preferably not less than 99.5 mass %, of glycolic acid repeating units. PLAs encompass not only homopolymers of L-lactic acid or D-lactic acid, but also copolymers containing not less than 50 mass %, preferably not less than 75 mass %, more preferably not less than 85 mass %, and even more preferably not less than 90 mass % of L-lactic acid or D-lactic acid repeating units, as well as stereocomplex polylactic acids obtained by mixing a poly-L-lactic acid and a poly-D-lactic acid. As the PGLA, a copolymer in which the ratio (mass ratio) of glycolic acid repeating units to lactic acid repeating units is from 99:1 to 1:99, preferably from 90:10 to 10:90, and more preferably from 80:20 to 20:80, may be used.

(Melt Viscosity)

A substance having a melt viscosity of ordinarily from 50 to 5000 Pa·s, preferably from 150 to 3000 Pa·s, and more preferably from 300 to 1500 Pa·s can be used as an aliphatic polyester—preferably a PGA, PLA, or PGLA. The melt viscosity is measured at a temperature of 270° C. and a shear rate of 122 sec$^{-1}$. When the melt viscosity is too small, the strength required of the mandrel 1 provided in the plug for well drilling may be insufficient. When the melt viscosity is too large, a high melting temperature becomes necessary to produce the mandrel 1, for example, which may lead to a risk that the aliphatic polyester may be thermally degraded, or the degradability may be insufficient. The melt viscosity described above is measured using a capilograph ("Capilograph 1-C" manufactured by Toyo Seiki Seisaku-sho, Ltd.) fitting with capillaries (1 mm in diameter×10 mm in length) under conditions with a shear rate of 122 sec$^{-1}$ after keeping approximately 20 g of a sample at a prescribed temperature (270° C.) for 5 minutes.

A particularly preferable PGA serving as an aliphatic polyester is a PGA having a weight average molecular weight of from 180,000 to 300,000 and a melt viscosity of from 700 to 2000 Pa·s when measured at a temperature of 270° C. and a shear rate of 122 sec$^{-1}$ from the perspective of the moldability as indicated by resistance to cracking when molded by solidification- and extrusion-molding, for example. Of these, a preferable PGA is a PGA having a weight average molecular weight of from 190,000 to 240,000 and a melt viscosity of from 800 to 1200 Pa·s when measured at a temperature of 270° C. and a shear rate of 122 sec$^{-1}$. The melt viscosity is measured with the method described above. The weight average molecular weight is measured by gel permeation chromatography (GPC) under the following conditions using 10 μL of a sample solution obtained by dissolving a 10 mg sample of PGA in hexafluoroisopropanol (HFIP) in which sodium trifluoroacetate was dissolved at a concentration of 5 mM so as to form a 10 mL solution, and then filtering the solution using a membrane filter.

<GPC Measurement Conditions>
Instrument: Shimazu LC-9A, manufactured by Shimadzu Corporation
Columns: two HFIP-806M columns (connected in series)+ one HFIP-LG precolumn manufactured by Showa Denko K.K.
Column Temperature: 40° C.
Eluent: HFIP solution in which sodium trifluoroacetate is dissolved at a concentration of 5 mM
Flow rate: 1 mL/min
Detector: differential refractometer
Molecular weight calibration: data of a molecular weight calibration curve produced by using five types of polymethylmethacrylates having standard molecular weights that are different from each other (manufactured by Polymer Laboratories Ltd.) is used.

[Other Blended Components]

The degradable material—preferably a degradable resin, more preferably an aliphatic polyester, and even more preferably a PGA—may also contain or be blended with various additives as other blended components, such as resin materials (other resins when the degradable material is a degradable resin), stabilizers, degradation accelerators or degradation inhibitors, and reinforcing materials, within a range that does not hinder the object of the present invention. The degradable material preferably contains a reinforcing material, and in this case, the degradable material can be called a composite material. When the degradable material is degradable resin, it is a so-called reinforced resin. The mandrel 1 formed from a reinforced resin is preferably formed from an aliphatic polyester containing a reinforcing material.

[Reinforcing Material]

As reinforcing materials, materials conventionally used as reinforcing materials of resin materials or the like with the objective of improving mechanical strength or heat resistance may be used, and fibrous reinforcing materials or granular or powdered reinforcing materials may be used. The reinforcing materials may be contained typically in the amount of not greater than 150 parts by mass, and preferably in the range of 10 to 100 parts by mass, relative to 100 parts by mass of the degradable material such as degradable resin.

Examples of fibrous reinforcing materials include inorganic fibrous substances such as glass fibers, carbon fibers, asbestos fibers, silica fibers, alumina fibers, zirconia fibers, boron nitride fibers, silicon nitride fibers, boron fibers, and potassium titanate fibers; metal fibrous substances such as stainless steel, aluminum, titanium, steel, and brass; and organic fibrous substances with a high melting point such as aramid fibers, kenaf fibers, polyamides, fluorine resins, polyester resins, and acrylic resins; and the like. Short fibers having a length of not greater than 10 mm, more preferably 1 to 6 mm, and even more preferably 1.5 to 4 mm are preferable as the fibrous reinforcing materials. Furthermore, inorganic fibrous substances are preferably used, and glass fibers are particularly preferable.

As the granular or powdered reinforcing material, mica, silica, talc, alumina, kaolin, calcium sulfate, calcium carbonate, titanium oxide, ferrite, clay, glass powder (milled fiber or the like), zinc oxide, nickel carbonate, iron oxide, quartz powder, magnesium carbonate, barium sulfate, and the like can be used. These reinforcing materials may be each used alone or in combinations of two or more types. The reinforcing material may be treated with a sizing agent or surface treatment agent as necessary.

[Composite Material Containing Degradable Material]

Further, the mandrel 1 formed from a degradable material, which is provided in the plug for well drilling of the present invention, may be a mandrel in which a metal or inorganic product member is incorporated into a degradable material—that is, the mandrel 1 comprising a composite material containing a degradable material formed from a degradable material and a material such as a metal or an inorganic substance. The mandrel 1 formed from a composite material containing a degradable material may be, for example, a mandrel 1 comprising indentations having a prescribed shape provided in a base material formed from a degradable material such as a degradable resin exemplified by PGA, fitting a metal (metal piece or the like) or an inorganic substance having a shape matching the shape of the indentations into the indentations, and fixing the metal or inorganic substance using an adhesive or fixing the metal or inorganic substance by wrapping wires, fibers, or the like so that the fixed state of the base material and the metal pieces or inorganic substance can be maintained.

[60° C. Tensile Strength]

The mandrel 1 provided in the plug for well drilling of the present invention is preferably formed from a degradable material having a tensile strength at a temperature of 60° C. (also called the "60° C. tensile strength" hereafter) of not less than 50 MPa. Since the plug for well drilling of the present invention is formed from a degradable material in which the 60° C. tensile strength of the mandrel 1 is not less than 50 MPa, the plug for well drilling can have sufficient strength to withstand tensile stress applied to the mandrel 1 in an environment at a temperature of approximately 60° C., which is typical in the shale gas layer, and further in high-temperature environments exceeding a temperature of 100° C., such as deep underground at a depth exceeding 3000 m, for example. The 60° C. tensile strength of the degradable material forming the mandrel 1 is measured in accordance with JIS K7113, and the tensile strength (units: MPa) is measured while a sample piece is left in an oven to make the test temperature 60° C. The 60° C. tensile strength of the degradable material forming the mandrel 1 is preferably not less than 75 MPa and more preferably not less than 100 MPa. In order to make the 60° C. tensile strength of the degradable material forming the mandrel 1 not less than 50 MPa, a method entailing adjusting the type and characteristics (melt viscosity, molecular weight, and the like) of the degradable material—e.g., a degradable resin—or the type, characteristics, and added amount of additives such as reinforcing materials may be used. When the 60° C. tensile strength of the degradable material forming the mandrel 1 is not less than 50 MPa, the load capacity of the mandrel 1 can be adjusted appropriately by adjusting the thickness (cross-sectional area) or shape of the mandrel 1. The upper limit of the 60° C. tensile strength is not particularly limited but is normally 1000 MPa and often 750 MPa.

[Shearing Stress at Temperature of 66° C.]

In addition, the mandrel 1 provided in the plug for well drilling of the present invention is preferably formed from a degradable material having a shearing stress at a temperature of 66° C. of not less than 30 MPa. That is, when the mandrel 1 is formed from a degradable material having a shearing stress at a temperature of 66° C. of not less than 30 MPa, it is possible to ensure that the engagement of an engagement part (for example, the screw part or diameter-expanded part of the mandrel) with a jig for tensioning and/or compressing the mandrel 1 or an engagement part with a pair of rings or other members attached to the outer circumferential surface orthogonal to the axial direction of the mandrel 1 when undergoing a large pressure in the axial direction of the mandrel due to a fracturing fluid or the like is reliably maintained. The load capacity of an engagement part depends on the magnitude of the shearing stress of materials having a small shearing stress in the temperature environment in which the engagement part is present among of the materials constituting the engagement part, and the area of the engagement part, but when the mandrel 1 is formed from a degradable material having a shearing stress at a temperature of 66° C. of not less than 30 MPa, the load capacity of the engagement part at a temperature of 66° C. can be made sufficiently large. As a result, well treatment such as fracturing, wherein the mandrel 1 undergoes a large pressure in the axial direction of the mandrel 1 due to a fluid, can be performed reliably in accordance with a desired time schedule ranging from a few hours to a few days, for example. The shearing stress at a temperature of 66° C. of the degradable material forming the mandrel 1 is preferably not less than 45 MPa and more preferably not less than 60 MPa. The upper limit of the shearing stress at a temperature of 66° C. of the degradable material is not particularly limited, but is normally not greater than 600 MPa, and often not greater than 450 MPa.

[Decrease in Thickness after Immersion in Water]

In addition, the mandrel 1 formed from a degradable material in the plug for well drilling of the present invention preferably has a decrease in thickness of less than 5 mm after immersion in water at a temperature of 66° C. for 1 hour, and a decrease in thickness of not less than 10 mm after immersion in water at a temperature of 149° C. for 24 hours. That is, when the mandrel 1 has a decrease in thickness of less than 5 mm, more preferably less than 4 mm, and even more preferably less than 3 mm after immersion in water at a temperature of 66° C. for 1 hour, the likelihood that the degradable material forming the mandrel 1 will degrade (which may be disintegration or a decrease in strength, as described above) in a downhole environment at a temperature of approximately 66° C. is small, so the shape and size of the mandrel 1 are maintained nearly perfectly, and the engagement with the pair of rings and other members attached to the outer circumferential surface orthogonal to the axial direction of the mandrel 1 is maintained reliably. Accordingly, well treatment such as fracturing, wherein the mandrel 1 undergoes a large pressure in the axial direction of the mandrel 1 due to a fluid, can be performed reliably in accordance with a desired time schedule ranging from a few hours to a few days, for example. The lower limit of the decrease in thickness after immersion in water at a temperature of 66° C. for 1 hour is not particularly limited but is preferably 0 mm and may be approximately 0.1 mm. At the same time, when the mandrel 1 has a decrease in thickness of not less than 10 mm, preferably not less than 12 mm, and even more preferably not less than 15 mm after immersion in water at a temperature of 149° C. for 24 hours, the degradable material forming the mandrel 1 degrades (which may be disintegration or a decrease in strength, as described above) in a short period of time—for example, a few hours, days, or weeks—when the mandrel 1 is brought into contact with a fluid at a temperature of 149° C., for example, after well treatment such as fracturing, which makes it possible to accelerate the degradation of the plug for well drilling. The upper limit of the decrease in thickness after immersion in water at a temperature of 149° C. for 24 hours is not particularly limited but is preferably 100% of the thickness (or diameter) of the mandrel 1 and may be approximately 95% of the thickness. When the decrease in thickness after immersion in water at a temperature of 149° C. for 24 hours is 100% —that is, when the thickness of the mandrel 1 after immersion in water at a temperature of 149° C. for 24 hours is 0 mm—the time from when immersion in water at a temperature of 149° C. begins until the thickness of the mandrel 1 reaches 0 mm can also be measured. In addition, members formed from degradable materials of the plug for well drilling of the present invention, such as the mandrel 1 formed from a degradable material in the plug for well drilling of the present invention, may undergo the progression of so-called surface degradation primarily consisting of degradation from the surface of the member in a downhole environment in which the degradation of degradable materials may progress markedly due to immersion in or contact with water at a temperature not less than a prescribed temperature, for example. In this case, in a member formed from a degradable material in the plug for well drilling, the degradation of the degradable material occurs successively from a surface site in contact with water or the like at a temperature not less than an exemplified prescribed temperature, and as a result, the thickness of the member decreases over time. For example, when a tabular body formed from PGA is immersed in water at a temperature of 149° C., a phenomenon in which the thickness decreases linearly over time is often confirmed.

[Tensile Load Capacity at a Temperature of 66° C.]

The mandrel 1 provided in the plug for well drilling of the present invention preferably has a tensile load capacity of not less than 5 kN at a temperature of 66° C. Accordingly, the degradable material is preferably selected and the mandrel is designed so that the tensile load capacity at a temperature of 66° C. is not less than 5 kN. In order to operate the plug for well drilling of the present invention—that is, in order to express the function of the plug by expanding the diameters of a diametrically expandable annular rubber member 2 and slips 3 and 3'—a load is ordinarily applied so as to press a member attached to the outer circumferential surface orthogonal to the axial direction of the mandrel 1 to the ring 5' side with respect to the mandrel 1, so a high tensile load of approximately 20 to approximately 1000 kN and, in many cases, approximately 25 to approximately 800 kN is applied to the mandrel 1. In addition, a screw part, a diameter-expanded part, or the like may be provided on both ends of the mandrel 1 so that a jig for tensioning and/or compressing the mandrel 1 can be engaged, but a 2- to 5-fold stress concentration may occur in the screw part, diameter-expanded part, or the like (parts engaging with the jig) depending on the design. Thus, a material having the strength to withstand such high load (degradable material) must be selected for the mandrel 1, and the mandrel 1 must be designed so as to minimize the stress concentration. In addition, when undergoing a large pressure in the axial direction of the mandrel due to a fracturing fluid or the like, a high load is also applied to the engagement part with the pair of rings and other members attached to the outer circumferential surface orthogonal to the axial direction of the mandrel 1, so similar material selection and design are necessary. The tensile load capacity of the mandrel 1 at a temperature of 66° C. is preferably not less than 20 kN, more preferably not less than 30 kN, and even more preferably not less than 50 kN from the perspective of sufficiently withstanding a high load. The upper limit of the tensile load capacity of the mandrel 1 at a temperature of 66° C. is not particularly limited but is ordinarily not more than 1500 kN and in many cases not more than 1200 kN from the perspective of the selection of the degradable material or the like.

[Fixing Part]

As described above, the mandrel 1 may have convex parts, stepped parts, concave parts (grooves), or the like on the outer circumferential surface. The convex parts, stepped parts, concave parts (grooves), or the like can be used as sites for attaching and fixing other members to the outer circumferential surface of the mandrel 1, and in particular, can be used as fixing parts for fixing the diametrically expandable annular rubber member 2.

As described in detail below, the plug for well drilling of the present invention is provided with at least one diametrically expandable annular rubber member 2 disposed on the outer circumferential surface orthogonal to the axial direction of the mandrel 1. The diametrically expandable annular rubber member 2 expands in diameter in the direction orthogonal to the axial direction as a distance in the axial direction of the mandrel 1 is reduced (reduced in diameter) so as to come into contact with the inside wall H of the borehole and the outer circumferential surface of the mandrel 1 and to plug (seal) the space between the plug and the borehole. Next, it is necessary for the seal between the plug and the borehole to be maintained while fracturing is performed, so in many cases the diametrically expandable annular rubber member 2 must be held by some means in an expanded state—that is, in a compressed state in the axial direction of the mandrel 1.

Since the mandrel 1 may have a convex part, stepped part, or concave part (groove) on the outer circumferential surface, the mandrel 1 provided in the plug for well drilling of the present invention preferably has a fixing part for fixing the diametrically expandable annular rubber member 2 to the outer circumferential surface in the compressed state. This fixing part may be a convex part, stepped part, or concave part (groove) as described above, or a screw part or other means capable of fixing the diametrically expandable annular rubber member 2 to the outer circumferential surface of the mandrel 1 in the compressed state can be used. From the perspective of ease of processing and molding, strength, and the like, the fixing part is more preferably at least one type selected from the group consisting of a groove, a stepped part, and a screw thread.

2. Diametrically Expandable Annular Rubber Member

The plug for well drilling of the present invention is provided with at least one diametrically expandable annular rubber member 2 disposed on the outer circumferential surface orthogonal to the axial direction of the mandrel 1. The diametrically expandable annular rubber member 2 comes into contact directly or indirectly with the pair of rings 5 and 5', the force in the axial direction of the mandrel 1 is transmitted to the diameter expandable circular rubber member 2 on the outer circumferential surface of the mandrel 1. As a result, the diametrically expandable annular rubber member 2 expands in diameter in a direction orthogonal to the axial direction of the mandrel 1 as the diametrically expandable annular rubber member 2 is compressed in the axial direction of the mandrel 1 and the distance in the axial direction is reduced (reduced in diameter). The annular rubber member 2 expands in diameter, and the outward part of the annular rubber member 2 in the direction orthogonal to the axial direction comes into contact with the inside wall H of the borehole, while the inward part of the annular rubber member 2 in the direction orthogonal to the axial direction comes into contact with the outer circumferential surface of the mandrel 1, thereby plugging (sealing) the space between the plug and the borehole. The diametrically expandable annular rubber member 2 can maintain a state of contact with the inside wall H of the borehole and the outer circumferential surface of the mandrel 1 while fracturing is subsequently performed, which yields the function of maintaining the seal between the plug and the borehole.

[150° C. 24-Hour Compressive Stress Decrease Rate]

The at least one diametrically expandable annular rubber member 2 provided in the plug for well drilling of the present invention is characterized by being formed from a degradable rubber material having a rate of decrease in the 50% strain compressive stress after immersion in water at a temperature of 150° C. for 24 hours relative to the 50% strain compressive stress before immersion (also called "150° C. 24-hour compressive stress decrease rate" hereafter) of not less than 5%. That is, at least one of the diametrically expandable annular rubber members 2 provided in the plug for well drilling of the present invention is a degradable (including disintegrable, as described above) diametrically expandable annular rubber member having a 150° C. 24-hour compressive stress decrease rate of not less than 5%. Because the at least one diametrically expandable annular rubber member 2 provided in the plug for well drilling of the present invention has a 150° C. 24-hour compressive stress decrease rate of not less than 5%, the rubber member degrades or disintegrates and disappears, disintegrates as a result of losing its strength, or undergoes a reduction in load capacity with respect to various forces applied to the rubber member within a few hours to a few weeks in the downhole [attendant to diversification of depth, there are often downhole environments at temperatures from approximately 60 (140) to approximately 204° C. (400° F.), and in recent years there are also downhole environments with even lower temperatures of approximately 25 to approximately 40° C.] which causes the loss of the plugging function. Accordingly, it is unnecessary to spend a large amount of money and time to recover or physically destroy the rubber member with the objective of releasing the plugging of the space between the plug and the borehole, which can contribute to a reduction in cost or a reduction in processes for recovering hydrocarbon resources. The at least one diametrically expandable annular rubber member 2 provided in the plug for well drilling of the present invention requires a diversity of performance (such as strength) maintenance time and degradation time according to the environment such as the temperature of various downholes and according to the processes carried out in that environment. Due to the fact that the diametrically expandable annular rubber member 2 of the present invention has a 150° C. 24-hour compressive stress decrease rate of not less than 5%, it has the characteristic of maintaining strength for a certain time and then degrading in various downhole temperature environments, such as 177° C. (350° F.), 163° C. (325° F.), 149° C. (300° F.), 121° C. (250° F.), 93° C. (200° F.), 80° C., or 66° C., as well as 25 to 40° C. Therefore, an optimal member can be selected according to the downhole environment and processes from the diametrically expandable annular rubber members 2 of the present invention, of which the 150° C. 24-hour compressive stress decrease rate is not less than 5%. In addition, in the diametrically expandable annular rubber member 2 of the present invention, the factors for controlling the degradation time, the degradation rate, or the like and the degree to which the degradation time, the degradation rate, or the like can be controlled differ depending on the type of the rubber material forming the diametrically expandable annular rubber member 2. However, for example, it is possible to control the degradation rate by the following means: adjusting the degree of vulcanization, i.e., controlling the extent of crosslinking between molecular chains; changing the vulcanization method and changing the type and ratio of the crosslinking agent; changing hardness (in general, degradation is suppressed when hardness is increased, and degradation is accelerated when hardness is decreased); adjusting the type and quantity of fillers and blending agents such as hydrolysis inhibitors; and changing molding conditions and curing conditions.

The at least one diametrically expandable annular rubber member 2 of the present invention formed from a degradable rubber material having a 150° C. 24-hour compressive stress decrease rate of not less than 5% has a 150° C. 24-hour compressive stress decrease rate of preferably not less than 10% and more preferably not less than 20% from the perspective of better degradability (or disintegrability) (enabling a design so that the material degrades in a desired short time). Although it also depends on the magnitude of value of the initial 50% strain compressive stress of the degradable rubber material described later (also called "50% strain compressive stress measured before immersion in water at a temperature of 150° C."), the 150° C. 24-hour compressive stress decrease rate is more preferably not less than 50%, particularly preferably not less than 70%, most preferably not less than 80%, and even more preferably not less than 90%. The upper limit of the 150° C. 24-hour compressive stress decrease rate of the diametrically expandable annular rubber member 2 is 100% (which means that the 50% strain compressive stress is completely lost after immersion in water at a temperature of 150° C. for 24 hours; specifically, this refers to cases in which a degradable polymer material in a sample cut out from the annular rubber member as described below degrades or dissolves so as to lose its shape or disappear while immersed in water at a temperature of 150° C. for 24 hours, cases in which the sample disintegrates before the 50% strain is reached when the compressive stress is measured, or the like).

If the 150° C. 24-hour compressive stress decrease rate is not less than 80%, the diametrically expandable annular rubber member after immersion in water at a temperature of 150° C. for 24 hours often loses its shape when touched lightly with the hand, although it also depends on the magnitude of the value of the initial 50% strain compressive stress. Similarly, if it is not less than 95%, there are cases where it does not maintain its shape to the extent that it is difficult to remove, and also similarly, if not less than 99%, there are cases where it is macroscopically visible that the shape is not maintained. In addition, a member of a plug for well drilling formed from a degradable rubber material, such as the diametrically expandable annular rubber member of the present invention formed from a degradable rubber material having a 150° C. 24-hour compressive stress decrease rate of not less than 5%, may undergo the progression of degradation from the surface or interior of the member, which is so-called bulk degradation, in a downhole environment in which the degradation of degradable rubber materials may progress markedly due to immersion in water at a temperature not less than a prescribed temperature, for example. Accordingly, when the value of the 50% strain compressive stress of a member of the plug for well drilling such as the diametrically expandable annular rubber member is 50% or lower with respect to the value of the initial 50% strain compressive stress of the member of the plug for well drilling (which can also be described as a rate of decrease in the 50% strain compressive stress of not less than 50%), the member of the plug for well drilling becomes easily disintegrable on the whole and loses its initial shape under a relatively small force, which may result in separating in pieces. As a result, as described below, the member of the plug for well drilling may lose its fluid-sealing function, or the initial shape may be lost so as to form a member with a thickness of essentially 0.

The method for measuring the 150° C. 24-hour compressive stress decrease rate of the diametrically expandable annular rubber member is as follows. Specifically, a sample cut out from a diametrically expandable annular rubber member to a thickness, length, and width of 5 mm, respectively, is immersed in 400 mL of water (deionized water) at a temperature of 150° C. and retrieved after 24 hours. According to JIS K7181 (conforming to ISO604), the 50% strain compressive stress is measured at room temperature, and the 50% strain compressive stress at the point of 50% displacement is found and used as the 50% strain compressive stress of the sample. The value of the 50% strain compressive stress of the sample after immersion in water at a temperature of 150° C. is compared to the value of the 50% strain compressive stress of the sample measured before being immersed in water (deionized water) at a temperature of 150° C. in advance ("initial 50% strain compressive stress"), and the rate of decrease (units: %) with respect to the initial 50% strain compressive stress is calculated and used as the 150° C. 24-hour compressive stress decrease rate. In addition, as described above, when the degradation of the degradable rubber material forming the diametrically expandable annular rubber member progresses markedly when immersed in water at a temperature of 150° C., the sample loses its initial shape under a relatively small force, so there is sometimes no difference in the obtained results even when measurements are performed without focusing attention on the size of the sample described above.

The initial 50% strain compressive stress of the at least one diametrically expandable annular rubber member provided in the plug for well drilling of the present invention is not particularly limited as long as the amount of time required to perform perforation or fracturing in a downhole deep underground (the time including the transport or movement of the plug to the prescribed position, the plugging of the downhole with the plug for well drilling, and preparation for and implementation of perforation or fracturing; generally about 1 to 2 days, but sometimes a shorter amount of time such as 30 minutes to a few hours) and the strength of the diametrically expandable annular rubber member 2 is maintained. However, it is normally not less than 1 MPa, and often not less than 3 MPa, and particularly preferably not less than 5 MPa. Similarly, the upper limit of the initial 50% strain compressive stress of the diametrically expandable annular rubber member is not particularly limited, but from the perspectives of ease of handling and degradability (or disintegrability), the initial 50% strain compressive stress is normally not greater than 200 MPa, and often not greater than 150 MPa.

[150° C. 72-Hour Mass Loss Rate]

Due to the fact that the at least one diametrically expandable annular rubber member 2 provided in the plug for well drilling of the present invention has a loss rate of mass after immersion in water at a temperature of 150° C. for 72 hours relative to the mass before immersion (also called "150° C. 72-hour mass loss rate" hereinafter) of from 5 to 100%, the rubber member degrades or disintegrates, and more desirably, disappears (also collectively called "degrade" in the present invention) within several hours to several weeks in a downhole (attendant to diversification of depth, there are downhole environments at temperatures from approximately 60 to approximately 200° C., and recently at low temperatures from approximately 25 to approximately 40° C.), and the seal function and the like are lost. Accordingly, it is unnecessary to spend a large amount of money and time to recover or physically destroy the rubber member, which can contribute to a reduction in cost or a reduction in processes for recovering hydrocarbon resources. For example, if the 150° C. 72-hour mass loss rate is 100%, the mass is 0 after the at least one diametrically expandable annular rubber member 2 is immersed in water at a temperature of 150° C. for 72 hours, meaning that it has completely disappeared, which is desirable. Due to the fact that the at least one diametrically expandable annular rubber member 2 of the present invention has a 150° C. 72-hour mass loss rate of 5 to 100%, the at least one diametrically expandable annular rubber member 2 has the characteristic of maintaining strength for a certain time and then degrading in various downhole temperature environments, such as 177° C., 163° C., 149° C., 121° C., 93° C., 80° C., or 66° C., as well as 25 to 40° C. Therefore, an optimal member can be selected according to the downhole environment and processes from the at least one diametrically expandable annular rubber members 2 of the present invention, of which the 150° C. 72-hour mass loss rate is from 5 to 100%.

Although it also depends on the magnitude of the value of the initial mass (called "mass measured before immersion in water at a temperature of 150° C."), the at least one diametrically expandable annular rubber member 2 of the present invention has a 150° C. 72-hour mass loss rate of preferably from 10 to 100%, more preferably from 20 to 100%, even more preferably from 50 to 100%, particularly preferably from 80 to 100%, and most preferably from 90 to 100% from the perspective of better degradability (or disintegrability) (degrading in a desired short time). The at least one diametrically expandable annular rubber member 2 of the present invention may be designed and prepared as necessary so that the 150° C. 72-hour mass loss rate is 100%, and the loss rate of mass after immersion for 72 hours in water of various temperatures, such as 93° C., 66° C., or the like, relative to the initial mass is, for example, not greater than 20%, not greater than 10%, or less than 5%.

The method for measuring the 150° C. 72-hour mass loss rate of the at least one diametrically expandable annular rubber member 2 is as follows. Specifically, a sample of the at least one diametrically expandable annular rubber member 2 cut out to a size of 20 mm each in thickness, length, and width is immersed in 400 mL of 150° C. water (deionized water or the like). The mass of the sample measured after being removed after 72 hours and the mass of the sample measured before being immersed in water at a temperature of 150° C. in advance ("initial mass") are compared, and the rate of loss (units: %) relative to the initial mass is calculated.

[66° C. Tensile Fracture Strain]

Since the at least one diametrically expandable annular rubber member 2 provided in the plug for well drilling of the present invention has a tensile fracture strain at a temperature of 66° C. (also called the "66° C. tensile fracture strain" hereafter) of not less than 50%, the strength of the at least one diametrically expandable annular rubber member 2 is maintained for a certain time required to perform well treatment such as fracturing, which is preferable in that the plugging of the downhole can be more reliably maintained. Specifically, when a borehole is plugged (sealed) using the at least one diametrically expandable annular rubber member 2, there is no risk of the at least one diametrically expandable annular rubber member 2 breaking even if it is deformed so as to reliably engage with the shape of the downhole tool and the shape of the downhole (shape of the casing), and specifically, even if it is deformed while incurring large tensile force (and compressive force). Therefore, the contact area of the at least one diametrically expandable annular rubber member 2 and the casing is large, resulting in reliable plugging. Additionally, it has the effect that the fluid seal is difficult to break even if it incurs large tensile force (and compressive force) due to extremely high pressure being applied by fluid for implementing a treatment that requires sealing such as fracturing. The 66° C. tensile fracture strain is the strain measured at tensile fracture (units: %) at a temperature of 66° C. in accordance with ISO 37 (JIS K6251). The 66° C. tensile fracture strain is preferably not less than 80%, and more preferably not less than 100%. The 66° C. tensile fracture strain does not have a particular upper limit, but it is normally not greater than 500% and often not greater than 480% because if the 66° C. tensile fracture strain is too high, the at least one diametrically expandable annular rubber member 2 may not easily break into small fragments when it is degraded and loses strength after the required well treatments.

[66° C. Compressive Stress]

Since the at least one diametrically expandable annular rubber member 2 provided in the plug for well drilling of the present invention has a 70% strain compressive stress at a temperature of 66° C. (also called the "66° C. compressive stress" hereafter) of not less than 10 MPa, the strength of the at least one diametrically expandable annular rubber member 2 is maintained for a certain time required to perform well treatment such as fracturing, which is preferable in that the plugging of the downhole can be more reliably maintained. Specifically, when a borehole is plugged (sealed) using the at least one diametrically expandable annular rubber member 2, there is no risk of the at least one diametrically expandable annular rubber member 2 breaking even if it is deformed so as to reliably engage with the shape of the downhole tool and the shape of the downhole (shape of the casing), and specifically, even if it is deformed while incurring large compressive force (and tension). Therefore, the contact area of the at least one diametrically expandable annular rubber member 2 and the casing is large, resulting in reliable plugging. Additionally, it has the effect that the fluid seal is difficult to break even if it incurs large compressive force (and tensile force) due to extremely high pressure being applied by fluid for implementing a treatment that requires sealing such as fracturing. The 66° C. compressive stress (i.e., 70% strain compressive stress at a temperature of 66° C.) represents the maximum stress value until fracture when it fractures before reaching the compressive stress at compressive strain of 70% (unit: MPa) or 70% compressive strain, measured at a temperature of 66° C. in accordance with ISO 14126 (JIS K7018). The 66° C. compressive stress is preferably not less than 12 MPa, and even more preferably not less than 15 MPa. The upper limit of the 66° C. compressive stress is not particularly limited, but is normally not greater than 200 MPa, and often not greater than 150 MPa.

[66° C. Compressive Fracture Strain]

Since the at least one diametrically expandable annular rubber member 2 provided in the plug for well drilling of the present invention has a compressive fracture strain at a temperature of 66° C. (also called the "66° C. compressive fracture strain" hereafter) of not less than 50%, the strength of the at least one diametrically expandable annular rubber member 2 is maintained for a certain time required to perform well treatment such as fracturing, which is preferable in that the plugging of the downhole can be more reliably maintained. The 66° C. compressive fracture strain is the strain measured at compressive fracture (units: %) at a temperature of 66° C. in accordance with ISO 14126 (JIS K7018). The 66° C. compressive fracture strain is preferably not less than 60%, and more preferably not less than 70%. The upper limit of the 66° C. compressive fracture strain is 100%, but is normally not greater than 99%.

[Surface Hardness]

In addition to the desired characteristics of the 66° C. tensile fracture strain, the 66° C. compressive stress, and the 66° C. compressive fracture strain described above, it is preferable for the at least one diametrically expandable annular rubber member 2 provided in the plug for well drilling of the present invention to have a hardness (surface hardness) in the range of A60 to D80 from the perspective of seal function. The surface hardness of the at least one diametrically expandable annular rubber member 2 refers to the surface hardness expressed as type A (also called "surface hardness A" or simply "hardness A" hereinafter) or type D (also called "surface hardness D" or simply "hardness D" hereinafter) of durometer hardness measured in accordance with ISO 7619. Types of durometer hardness include type A for medium hardness suitable for general rubbers and the like, type D for high hardness suitable for hard rubbers and the like, and type E for low hardness suitable for sponges and the like (for example, hardness A100 is often roughly equivalent to hardness D60). Due to the fact that the hardness of the at least one diametrically expandable annular rubber member 2 of the present invention is in the range of A60 to D80, it can be configured such that borehole sealing can be performed while withstanding high-pressure fluid pressurization of fracturing and the like by also adjusting the structure and the like of the rubber member as desired. The surface hardness of the at least one diametrically expandable annular rubber member 2 is more preferably in the range of A65 to D78, and even more preferably A70 to D75.

[23° C. Compressive Stress Decrease Rate]

Since the at least one diametrically expandable annular rubber member 2 provided in the plug for well drilling of the present invention has a rate of decrease in a 50% strain compressive stress after immersion in water at a temperature of 23° C. for 6 hours relative to a 50% strain compressive stress after immersion in water at a temperature of 23° C. for 1 hour (also called the "23° C. compressive stress decrease rate" hereafter) of less than 5%, the strength of the at least one diametrically expandable annular rubber member 2 is maintained for a certain time required to perform well treatment such as fracturing, which is preferable in that the plugging of the downhole can be more reliably maintained. Specifically, plugging (in a protecting member, a protecting function of a sensor or the like) of the downhole is no longer lost in an unexpectedly short time due to the fact that excavation conditions for hydrocarbon resource recovery has become diverse. In particular, due to the fact that the at least one diametrically expandable annular rubber member 2 is stable in a dry environment, the seal function (in a protecting member, a protecting function) is not lost in the stage where the plug for well drilling of the present invention is arranged in a borehole and before well treatment such as fracturing is performed. The measurement method of the 23° C. compressive stress decrease rate of the at least one diametrically expandable annular rubber member 2 is the same as the measurement method of the 150° C. 24-hour compressive stress decrease rate, but instead of being immersed in water at temperature of 150° C., it is immersed for the required time in water at a temperature of 23° C. The 23° C. compressive stress decrease rate is more preferably less than 4%, and even more preferably less than 3%. The lower limit of the 23° C. compressive stress decrease rate is 0%. Note that for the at least one diametrically expandable annular rubber member 2 provided in the plug for well drilling of the present invention, "stable in a dry environment" means that the 50% strain compressive stress does not decrease for at least 168 hours (7 days) in an environment at a temperature of 23° C. and a relative humidity of 50%.

[66° C. Compressive Stress Ratio]

Since the at least one diametrically expandable annular rubber member 2 provided in the plug for well drilling of the present invention has a ratio of the compressive stress at a compressive strain of 70% relative to the compressive stress at a compressive strain of 5% (also called the "5% strain compressive stress" hereafter) at a temperature of 66° C. (also called the "66° C. compressive stress ratio" hereafter) of not less than 5, the strength of the at least one diametrically expandable annular rubber member 2 is maintained for a certain time required to perform well treatment such as fracturing, which is preferable in that the plugging of the downhole can be more reliably maintained. Specifically, when a borehole is plugged (sealed) using the at least one diametrically expandable annular rubber member 2, it is capable of deforming so as to reliably engage with the shape of the downhole tool and the shape of the downhole (shape of the casing) because the initial compressive strain of the at least one diametrically expandable annular rubber member 2 is small (it deforms easily). Additionally, when it is deformed while incurring large compressive force (and tensile force), due to the stress of the rubber member rising greatly in regions where the amount of deformation is large, it results in a state where the rubber member of the contact portion of the rubber member with the casing has a high compressive force (and tensile force), and as a result, even when high pressure or the like is applied, for example when a well treatment requiring a seal such as fracturing is performed, it has sufficient seal performance and plugging is reliable. The 66° C. compressive stress ratio is measured at a temperature of 66° C. in accordance with ISO 14126 (JIS K7018). The 66° C. compressive stress ratio is preferably not less than 8, and even more preferably not less than 10. The upper limit of the 66° C. compressive stress ratio is not particularly limited, but is normally not greater than 200, and often not greater than 150. Furthermore, in many cases, if the at least one diametrically expandable annular rubber member 2 of the present invention which has a 66° C. compressive stress ratio of not less than 5 also has a ratio of compressive stress at 70% compressive strain relative to compressive stress at 5% compressive strain of not less than 5 at other temperatures, such as, for example, the temperature range from room temperature to 177° C., it is more desirable in that it can fulfill the seal function and the like in the aforementioned wide temperature range. However, even if the above compressive stress ratio of the at least one diametrically expandable annular rubber member 2 is less than 5 in part of the above temperature range, for example, at a temperature of 149° C., the at least one diametrically expandable annular rubber member 2 is not hindered from practical use as long as the 66° C. compressive stress ratio is not less than 5.

[Degradable Rubber Material]

The degradable rubber material forming the at least one diametrically expandable annular rubber member provided in the plug for well drilling of the present invention is not particularly limited as long as it is a degradable rubber material that may have a 150° C. 24-hour compressive stress decrease rate of not less than 5% and/or a 150° C. 72-hour mass loss rate of from 5 to 100%, and the rubber material that is used may be selected from rubber materials conventionally known as biodegradable, hydrolyzable, or degradable rubbers that can be chemically degraded by some other method. For example, a degradable rubber material containing at least one type selected from the group consisting of urethane rubber, natural rubber, isoprene rubber, ethylene propylene rubber, butyl rubber, styrene rubber (styrene-butadiene rubber and the like), acrylic rubber, aliphatic polyester rubber, chloroprene rubber, polyester-based thermoplastic elastomer, and polyamide-based thermoplastic elastomer is preferable.

In addition, from the perspective of degradability and disintegrability, a degradable rubber material containing a rubber having a hydrolyzable functional group (for example, a urethane group, ester group, amide group, carboxyl group, hydroxyl group, silyl group, acid anhydride, acid halide, and the like) is also preferable, and a degradable rubber material containing a rubber having at least one bond comprising a urethane bond, an ester bond, or an amide bond is also preferable. A particularly preferable rubber material is a urethane rubber since it is possible to easily control the degradability or disintegrability thereof by adjusting the structure, hardness, degree of crosslinking, and the like of the rubber material or selecting other compounding agents. That is, a particularly preferable degradable rubber material contains a urethane rubber. In addition, a degradable rubber material containing a polyester-based thermoplastic elastomer or a polyamide-based thermoplastic elastomer is also preferable.

Furthermore, nitrile rubbers or hydrogenated nitrile rubbers, which are rubber materials that are conventionally used widely for downhole tools due to their excellent oil resistance, heat resistance, water resistance, and the like, are ordinarily unsuitable degradable rubber materials for forming the diametrically expandable annular rubber member of the present invention because it is normally difficult to achieve a 150° C. 24-hour compressive stress decrease rate within the prescribed range.

Since the diametrically expandable annular rubber member formed from the degradable rubber material described above has a 150° C. 24-hour compressive stress decrease rate of not less than 5%, preferably not less than 20%, and particularly preferably not less than 70%, the diametrically expandable annular rubber member may be, for example, biodegradable, meaning that it is degraded by microorganisms in the soil in which the fracturing fluid and the like are used, or hydrolyzable, meaning that it is degraded by a solvent such as fracturing fluid, particularly by water, and also by acids or alkalis if desired, and additionally, may be degradable material that can be degraded chemically by some other method, and in particular, it may be hydrolyzable, meaning that it is degraded by water of at least a prescribed temperature. Furthermore, as described above, the diametrically expandable annular rubber member may also be one in which the intrinsic strength of the rubber material decreases and the rubber material becomes weak due to a reduction in the degree of polymerization or the like, resulting in the diameter expandable circular rubber member easily disintegrating and losing its shape (disintegrability) when a very small mechanical force is applied. As a characteristic particularly suitable in a diametrically expandable annular rubber member, since it is required to have easy disintegrability, meaning that it disintegrates after a prescribed time by fluid such as fracturing fluid, a urethane rubber, acrylic rubber, polyester-based thermoplastic elastomer, or polyamide-based thermoplastic elastomer are preferably used, and they may be used alone or in a mixture with another rubber material or a resin material.

[Urethane Rubber]

The urethane rubber particularly preferably used as the degradable rubber material forming the diametrically expandable annular rubber member of the present invention (also called "urethane elastomer") is a rubber material having a urethane bond (—NH—CO—O—) in the molecule, and is normally obtained by condensation with an isocyanate compound and a compound having a hydroxyl group. As the isocyanate compound, aromatic (optionally having a plurality of aromatic rings), aliphatic, or alicyclic di-, tri-, or tetra-polyisocyanates or mixtures thereof are used. The compound having a hydroxyl group is broadly classified into polyester-type urethane rubbers having an ester-bond in the main chain thereof (also called "ester-based urethane rubbers" hereinafter) and polyether-based urethane rubbers having an ether-bond in the main chain thereof (also called "ether-type urethane rubbers" hereinafter), and ester-based urethane rubbers are preferred in many cases because their degradability and disintegrability are easier to control. Urethane rubber is an elastic body having both the elasticity (flexibility) of synthetic rubber and the rigidity (solidity) of plastic. It is generally known to have excellent abrasion resistance, chemical resistance, and oil resistance, high mechanical strength, high load tolerance, and high elasticity with high energy absorbency. Depending on differences in the molding method, urethane rubber can be classified into i) kneaded (millable) type, which can be molded by the same processing method as general rubber; ii) thermoplastic type, which can be molded by the same processing methods as thermoplastic resins; and iii) poured type, which can be molded by thermosetting process methods using liquid starting materials. Any type may be used as the urethane rubber that forms the diametrically expandable annular rubber member of the present invention.

[Acrylic Rubber]

The acrylic rubber preferably used as the degradable rubber material forming the diametrically expandable annular rubber member of the present invention is generically called a rubber-like polymer having an acrylic acid ester as the main component. These include ACM, which is a copolymer of an acrylic acid ester and a crosslinkable monomer, AEM, which is a copolymer of an acrylic acid ester and ethylene, ANM, which is a copolymer of an acrylic acid ester and acrylonitrile, and the like. Because acrylic rubber does not contain an unsaturated bond in the main chain, it has high chemical stability and has characteristics such as heat resistance, oil resistance, aging resistance, and the like. On the other hand, it is suitable as the rubber material forming the diametrically expandable annular rubber member of the present invention because it disintegrates over time since it has inferior water resistance and water vapor resistance.

[Polyester-Based Thermoplastic Elastomer]

The polyester-based thermoplastic elastomer preferably used as the degradable rubber material forming the diametrically expandable annular rubber member of the present invention is an elastomer containing a polyester-based block copolymer as a main component. Specific examples include block copolymers of a hard segment consisting of polyester and a soft segment consisting of polyether. Examples of the hard segment include aromatic polyesters and aliphatic polyesters, more specifically polyethylene terephthalate, polybutylene terephthalate, polyethylene naphthalate, polybutylene naphthalate, polyhydroxyalkanoic acid, and the like. Examples of the soft segment include polyethers such as polyethylene glycol, polypropylene glycol, polytetramethylene ether glycol, and the like. Other examples are block copolymers in which the hard segment and the soft segment consist of polyesters. Examples of the hard segment include aromatic polyesters, more specifically polyethylene terephthalate, polybutylene terephthalate, polyethylene naphthalate, polybutylene naphthalate, and the like. Examples of the soft segment include aliphatic polyesters having lower elasticity than the hard segment, such as polyhydroxyalkanoic acids having an alkyl chain length of 2 or more. The types and the ratio of these hard segments and soft segments may be adjusted so as to conform to the desired physical properties of the elastomer, particularly the desired degradation characteristics and mechanical characteristics. Additionally, a polyester-based thermoplastic elastomer having the desired physical properties may be obtained by further combining various compounding agents as necessary. The polyester-based thermoplastic elastomer has the characteristics of both plastic and rubber, and can be molded by injection molding, extrusion molding, blow molding, or the like. Additionally, due to having an ester bond, it has the characteristic of readily disintegrating in a prescribed time. Examples of commercially available products such as Pelprene® P type P30B (hardness A71; "hardness" is durometer type hardness in accordance with ISO 7619 (also simply called "hardness" hereinafter)), P40B (hardness A82), P40H (hardness A89), and P55B (hardness A94) manufactured by Toyobo Co., Ltd., and Hytrel® 3046 (hardness A77), G3548L (hardness A80), and 4047N (hardness A90) manufactured by DuPont-Toray Co., Ltd., and the like are materials with relatively high hardness for rubber, but their hardness is suited to the high-temperature, high-pressure conditions assumed in a downhole environment, and they are rubber materials suitable for a diametrically expandable annular rubber member. Additionally, Pelprene® S type S1001 (hardness A96) and 59001 (hardness A99) and Hytrel® 6377 (hardness D63) and 7277 (hardness D72) and the like have hardness suited to seal applications and the like as a thin rubber member, and are rubber materials suitable for a diametrically expandable annular rubber member. These polyester-based thermoplastic elastomers may be used alone but may also be used as a mixture with other thermoplastic elastomers and/or resin materials.

[Polyamide-Based Thermoplastic Elastomer]

The polyamide-based thermoplastic elastomer preferably used as the degradable rubber material forming the diametrically expandable annular rubber member of the present invention is a block copolymer of a hard segment consisting of polyamide and a soft segment consisting of a polyether and/or polyester. Examples of the hard segment include aliphatic polyamides, more specifically Nylon 6, Nylon 11, and Nylon 12, and examples of the soft segment include polyethers such as polyethylene glycol, polypropylene glycol, polytetramethylene ether glycol, and the like. The types and the ratio of these hard segments and soft segments may be adjusted so as to conform to the desired physical properties of the elastomer, particularly the desired degradation characteristics and mechanical characteristics. Additionally, a polyamide-based thermoplastic elastomer having the desired physical properties may be obtained by further combining various compounding agents as necessary. The polyamide-based thermoplastic elastomer has intermediate properties between rubber and plastic, and can be molded by various mold processing techniques such as injection molding, extrusion molding, and blow molding. Additionally, due to having an amide bond, it has the characteristic of hydrolyzing and readily disintegrating at high temperature and high pressure. Examples of commercially available products include TPAE-12 (hardness D12), TPAE-38 (hardness D32), TPAE-10 (hardness D41), TPAE-23 (hardness D62), and PA-260 (hardness D69) manufactured by T&K TOKA Corp., and the like. Since they have hardness suited to seal applications and the like as a thin rubber member, they are rubber materials suitable for a diametrically expandable annular rubber member. These polyamide-based thermoplastic elastomers may be used alone but may also be used as a mixture with other thermoplastic elastomers and/or resin materials.

[Specific Examples of Urethane Rubber]

Specific examples of particularly preferable urethane rubbers include ester-type thermoplastic urethane rubber of hardness A80 (uncrosslinked type), ester-type thermoplastic urethane rubber of hardness A80 (crosslinked type), ester-type thermoplastic urethane rubber of hardness A85 (uncrosslinked type), ester-type thermoplastic urethane rubber of hardness A85 (crosslinked type), ester-type thermoplastic urethane rubber of hardness A90 (uncrosslinked type), ester-type thermoplastic urethane rubber of hardness A90 (crosslinked type), ester-type thermoplastic urethane rubber of hardness A95 (uncrosslinked type), ester-type thermoplastic urethane rubber of hardness A95 (crosslinked type), and lactone-based ester-type thermoplastic urethane rubber of hardness D74 (crosslinked type), and further include ester-type thermosetting urethane rubber of hardness A70 [containing Stabaxol® as a hydrolysis inhibitor], ester-type thermosetting urethane rubber of hardness A82 (not containing a hydrolysis inhibitor), ester-type thermosetting urethane rubber of hardness A82 (containing the above hydrolysis inhibitor), ester-type thermosetting urethane rubber of hardness A90 (containing the above hydrolysis inhibitor), and ester-type thermosetting urethane rubber of hardness A90 (not containing a hydrolysis inhibitor).

Several specific examples of the above urethane rubbers will be described in further detail hereinafter.

(1) Using an ester-type thermoplastic urethane rubber (uncrosslinked type) of hardness A85, it is possible to prepare a diametrically expandable annular rubber member having a 150° C. 24-hour compressive stress decrease rate of 100%. For this rubber member, when the decrease rate of 50% strain compressive stress after immersion for a prescribed time in water at a temperature of 121° C. relative to the 50% strain compressive stress before immersion (also called "compressive stress decrease rate at 121° ° C." hereinafter) was measured, it was 21% after immersion for 24 hours, and 100% after immersion for 48 hours and 72 hours. It was found that the test specimen after immersion for 48 hours and 72 hours cracked after the 50% strain compressive stress test, and its shape did not recover.

(2) Using an ester-type thermoplastic urethane rubber (crosslinked type) of hardness A85, it is possible to prepare a diametrically expandable annular rubber member having a 150° C. 24-hour compressive stress decrease rate of 41%. For this rubber member, when the compressive stress decrease rate at 121° C. was measured, it was 1% after immersion for 24 hours, 1% after immersion for 48 hours, and 100% after immersion for 72 hours. It was found that the test specimen after immersion for 72 hours cracked after the 50% strain compressive stress test, and its shape did not recover. Further, the 66° C. tensile fracture strain of this rubber member was 414%, the 66° C. compressive stress was 41 MPa, and the 66° C. compressive fracture strain was not less than 95%. Additionally, it was stable in a dry environment, and the 23° C. compressive stress decrease rate was 0%, the 66° C. compressive stress ratio was 20, and the 150° C. 72-hour mass loss rate was 72%.

(3) Using an ester-type thermoplastic urethane rubber (crosslinked type) of hardness A95, it is possible to prepare a diametrically expandable annular rubber member having a 150° C. 24-hour compressive stress decrease rate of 100%.

(4) Using an ester-type thermosetting urethane rubber (not containing a hydrolysis inhibitor) of hardness A82, it is possible to prepare a diametrically expandable annular rubber member having a 150° C. 24-hour compressive stress decrease rate of 100%. For this rubber member, when the decrease rate of 50% strain compressive stress after immersion for a prescribed time in water at a temperature of 93° C. relative to the 50% strain compressive stress before immersion (also called "compressive stress decrease rate at a temperature of 93° C." hereinafter) was measured, it was 8% after immersion for 24 hours, 27% after immersion for 72 hours, 100% after immersion for 168 hours, and 100% after immersion for 336 hours. The test specimens after immersion for 168 hours and 336 hours cracked and were crushed during the 50% strain compressive stress test. Additionally, for this rubber member, when the decrease rate of 50% strain compressive stress after immersion for a prescribed time in water at a temperature of 66° C. relative to the 50% strain compressive stress before immersion (also called "compressive stress decrease rate at a temperature of 66° C." hereinafter) was measured, it was not greater than 5% after immersion for 24 hours.

(5) Using an ester-type thermosetting urethane rubber (containing the above hydrolysis inhibitor) of hardness A90, it is possible to prepare a diametrically expandable annular rubber member having a 150° C. 24-hour compressive stress decrease rate of 100%. The compressive stress decrease rate of this rubber member at a temperature of 93° C. was 28% after immersion for 24 hours, 44% after immersion for 72 hours, 50% after immersion for 168 hours, and 100% after immersion for 336 hours. It was found that the test specimen after immersion for 336 hours cracked after the 50% strain compressive stress test, and its shape did not recover.

(6) Using an ester-type thermosetting urethane rubber (not containing a hydrolysis inhibitor) of hardness A90, it is possible to prepare a diametrically expandable annular rubber member having a 150° C. 24-hour compressive stress decrease rate of 100%. The compressive stress decrease rate of this rubber member at a temperature of 93° C. was 20% after immersion for 24 hours, 40% after immersion for 72 hours, 100% after immersion for 168 hours, and 100% after immersion for 336 hours. The test specimens after immersion for 168 and 336 hours cracked and were crushed during the 50% strain compressive stress test. Furthermore, for this rubber member, the decrease rate of 50% strain compressive stress after immersion for a prescribed time in water at a temperature of 80° C. relative to the 50% strain compressive stress before immersion (also called "compressive stress decrease rate at a temperature of 80° C." hereinafter) was 9% after immersion for 24 hours, 11% after immersion for 72 hours, 23% after immersion for 168 hours, and 49% after immersion for 336 hours. In addition, the compressive stress decrease rate at 66° C. of this rubber member was not greater than 5% after immersion for 24 hours.

[Other Blended Components]

The diametrically expandable annular rubber member of the present invention may be a rubber material composite which, in addition to the degradable rubber material, particularly preferably urethane rubber, may also contain or be blended with various additives as other blended components, such as other types of rubber materials or resin materials, reinforcing materials, stabilizers, and degradation accelerators or degradation inhibitors, within a range that does not hinder the object of the present invention. In addition, by adding a pigment or dye as desired, it is also possible to form colored diametrically expandable annular rubber members having various identification functions such as brand colors. In particular, by including degradable materials as other blended components, it is possible to increase and adjust as necessary the degradability and disintegrability of the diametrically expandable annular rubber member of the present invention. For example, it is possible to cause the diametrically expandable annular rubber member itself to lose its original strength and lose its original shape due to the degradation of the degradable material contained as another blended component in the diametrically expandable annular rubber member. Examples of degradable materials contained as other blended components include known degradable resins such as aliphatic polyesters such as PGA, PLA, and PGLA, and mixtures thereof. Furthermore, as the diametrically expandable annular rubber member of the present invention, it is also possible to use a blend with other rubber materials such as nitrile rubber, isoprene rubber, ethylene propylene rubber, butyl rubber, styrene rubber (styrene-butadiene rubber and the like), fluorine rubber, and silicone rubber, in the range of from 5 to 150 parts by mass, preferably from 10 to 100 parts by mass, relative to 100 parts by mass of a urethane rubber, polyester-based thermoplastic elastomer or polyamide-based thermoplastic elastomer, or the like (also called a "urethane rubber or the like" hereafter). For example, as previously described, a nitrile rubber is a rubber material that is normally difficult to achieve a 150° C. 24-hour compressive stress decrease rate within the prescribed range, but when a diametrically expandable annular rubber member is obtained by using it in a blend with urethane rubber, which is a degradable rubber material having a high 150° C. 24-hour compressive stress decrease rate, the diametrically expandable annular rubber member and the plug for well drilling can be relatively easily recovered because the nitrile rubber also cannot maintain its shape due to the fact that the urethane rubber readily degrades or disintegrates.

[Reinforcing Material]

The diametrically expandable annular rubber member of the present invention may also preferably contain a reinforcing material as another blended component in addition to the degradable rubber material, preferably a urethane rubber or the like. As reinforcing materials, the same materials such as resin materials conventionally used as reinforcing materials with the objective of improving mechanical strength or heat resistance as those described in regard to the mandrel 1 may be used, and the fibrous reinforcing materials or granular or powdered reinforcing materials described in regard to the mandrel 1 may be used. The reinforcing materials may be contained typically in the amount of not greater than 150 parts by mass, and preferably in the range of 10 to 100 parts by mass, relative to 100 parts by mass of the degradable rubber material, preferably a urethane rubber, polyester-based thermoplastic elastomer, polyamide-based thermoplastic elastomer, or the like.

The diametrically expandable annular rubber member 2 is not limited with regard to its shape or structure as long as it has the function described above. For example, by using a diametrically expandable annular rubber member 2 having a shape in which the cross-section in the circumferential direction orthogonal to the axial direction of the mandrel 1 has an inverted U-shape, it can expand in diameter toward the vertex of the inverted U-shape as the tip portion of the U-shape is compressed in the axial direction of the mandrel 1.

The diametrically expandable annular rubber member 2 comes into contact with the inside wall H of the borehole and the outer circumferential surface of the mandrel 1 when expanded in diameter so as to plug (seal) the space between the plug and the borehole, and a gap is present between the plug and the borehole when the diametrically expandable annular rubber member 2 is not expanded. Therefore, the length of the diametrically expandable annular rubber member 2 in the axial direction of the mandrel 1 is preferably from 10 to 90% and more preferably from 15 to 80% with respect to the length of the mandrel 1. Since the diametrically expandable annular rubber member 2 has the aforementioned length in the axial direction of the mandrel 1, it is possible to impart a sufficient sealing function to the plug for well drilling provided with the diametrically expandable annular rubber member 2 and to fulfill a function of assisting the fixing of the borehole and the plug after sealing.

The plug for well drilling of the present invention may comprise at least one diametrically expandable annular rubber member 2 formed from a degradable rubber material, but it may also comprise a plurality of the diametrically expandable annular rubber members 2 formed from a degradable rubber material. By so doing, it can plug (seal) the space between the plug and the borehole at a plurality of positions, and the function of assisting the fixing of the borehole and the plug can be achieved even more reliably. When the plug for well drilling of the present invention is provided with a plurality of diametrically expandable annular rubber members 2, the length of the diametrically expandable annular rubber members 2 in the axial direction of the mandrel 1 described above refers to the total of the lengths of the plurality of diametrically expandable annular rubber members 2 in the axial direction of the mandrel 1. When the plug for well drilling of the present invention is provided with a plurality of diametrically expandable annular rubber members 2, the diametrically expandable annular rubber members 2 may have the same materials, shapes, or structures, or they may be different. In addition, a plurality of diametrically expandable annular rubber members 2 may be disposed adjacently or at a distance from one another at positions between the pair of rings 5 and 5' to be described in detail later, or may be disposed at positions between each pair of a plurality of pairs of rings 5 and 5'.

The diametrically expandable annular rubber member 2 may be a rubber member with a structure formed from a plurality of rubber members such as a laminated rubber, or it may be a rubber member with a structure formed by disposing rubber members or the like having different compositions or mechanical properties such as hardness in the axial direction. In addition, the diametrically expandable annular rubber member 2 may be provided with one or more grooves, convex parts, rough surfaces (corrugation), or the like at the parts making contact with the inside wall H of the borehole in order to further ensure the plugging (sealing) of the space between the plug and the downhole and the assistance of the fixing of the borehole and the plug at the time of diameter expansion.

3. Slips and Wedges

The plug for well drilling of the present invention is provided with at least one slip 3 disposed on the outer circumferential surface orthogonal to the axial direction of the mandrel 1. The slip 3 may be provided in combination with a wedge-shaped wedge 4. That is, a plug for well drilling provided with at least one wedge 4 disposed on the outer circumferential surface orthogonal to the axial direction of the mandrel is preferable. The slip 3 and preferably a combination of a slip 3 and a wedge 4 are themselves well known as means for fixing the plug and the borehole in the plug for well drilling. That is, a slip 3 formed from a material such as a metal or an inorganic product is disposed in slidable contact with the sloping upper surface of a wedge 4 formed from a material such as a composite material, and when a force in the axial direction of the mandrel 1 is applied to the wedge 4 by the method described above, the slip 3 moves outward in a direction orthogonal to the axial direction of the mandrel 1 so as to make contact with the inside wall H of the borehole and to fix the plug and the inside wall H of the borehole.

It is not absolutely necessary for the slip 3 to be provided in combination with the wedge 4 as long as it moves outward in a direction orthogonal to the axial direction of the mandrel and comes into contact with the inside wall H of the borehole so as to fulfill a function of fixing the plug and the inside wall H of the borehole.

The slips 3 may be provided with one or more grooves, convex parts, rough surfaces (corrugation), or the like at the parts making contact with the inside wall H of the borehole in order to make the plugging (sealing) of the space between the plug and the borehole even more reliable. In addition, the slip 3 may be divided into a prescribed number in the circumferential direction orthogonal to the axial direction of the mandrel 1, or, as illustrated in FIG. 1, may have notches beginning at one end along the axial direction and ending at an intermediate point in the direction of the other end without being divided into a prescribed number in advance (when the slip 3 is provided in combination with the wedge 4, a force in the axial direction of the mandrel 1 is applied to the wedge 4, and the wedge 4 penetrates into the lower surfaces of the slip 3 so that the slip 3 is divided along the notches and the extended lines thereof, and each divided piece of the slip 3 then moves outward in a direction orthogonal to the axial direction of the mandrel 1).

The plug for well drilling of the present invention is preferably a plug for well drilling provided with a pair of rings 5 and 5' disposed on the outer circumferential surface orthogonal to the axial direction of the mandrel, wherein the at least one diametrically expandable annular rubber member 2 formed from a degradable rubber material is provided between the pair of rings 5 and 5'. That is, with the plug for well drilling described above, by designing the slip 3 or the combination of the slip 3 and the wedge 4 so as to be disposed adjacent to the diametrically expandable annular rubber member 2, it becomes easy to apply a force in the axial direction of the mandrel 1 to the slip 3 or the combination of the slip 3 and the wedge 4.

Figure 1B:
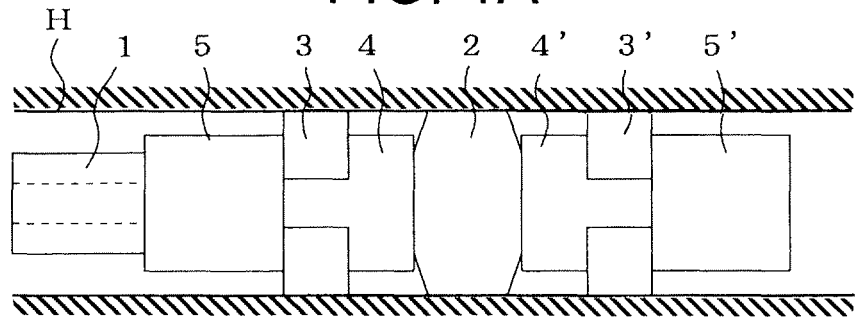
FIG. 1B is a schematic diagram illustrating a state in which the diameter of the diametrically expandable annular rubber member of the plug for well drilling of FIG. 1A has expanded.

As illustrated in FIG. 1, the plug for well drilling of the present invention may be provided with a plurality of combinations of slips 3 and wedges 4 (combinations of slips 3 and 3' and wedges 4 and 4'), and in this case, they may be disposed adjacently so as to sandwich the diametrically expandable annular rubber member 2, or they may be disposed at other positions. When the plug for well drilling of the present invention is provided with a plurality of diametrically expandable annular rubber members 2, the arrangement of the combinations of slips 3 and 3' and wedges 4 and 4' with respect to the plurality of diametrically expandable annular rubber members 2 can be selected appropriately as desired.

[Degradable Material]

As long as the plug can be fixed to the downhole by the slip 3, the slip 3—preferably a combination of the slip 3 and the wedge 4 (including combinations of slips 3 and 3' and wedges 4 and 4' when a plurality of combinations of slips 3 and wedges 4 are provided)—of the present invention is such that one or both of the slip 3 or the wedge 4 may be formed from a degradable material, and one or both of the slip 3 or the wedge 4 may be a composite material containing a reinforcing material (reinforced resin). Additionally, a metal or an inorganic product member may also be incorporated into the degradable material. As the degradable material or reinforcing material, the same materials as described above may be used.

Accordingly, one or both of the slip 3 or the wedge 4 may be formed from a degradable material and, as in conventional cases, may be formed from a material containing at least one of a metal or an inorganic product. Further, one or both of the slip 3 or the wedge 4 may be one in which a metal or inorganic product member is incorporated into a degradable material—that is, one formed from a material containing a degradable material and at least one of a metal or an inorganic product (composite material of a degradable material and a metal or an inorganic product).

A specific example of a slip 3 or a wedge 4 in the form of a composite material of a degradable material and a metal or an inorganic product is slip 3 or a wedge 4 formed by providing indentations having a prescribed shape in a base material formed from a degradable material such as a degradable resin such as PGA, fitting a metal (metal piece or the like) or an inorganic substance having a shape matching the shape of the indentations into the indentations, and fixing the metal or inorganic substance with an adhesive or fixing the metal or inorganic substance by wrapping wires, fibers, or the like around the materials so that the fixed state of the base material and the metal pieces or inorganic substance can be maintained. This combination of a slip 3 and a wedge 4 has a function of fixing the plug for well drilling inside the borehole as the base material of the slip 3 runs onto the upper part of the wedge 4 at the time of operation so that the metal or inorganic product comes into contact with the inside wall H of the borehole.

4. Rings

As described above, the plug for well drilling of the present invention is preferably a plug for well drilling provided with a pair of rings 5 and 5' disposed on the outer circumferential surface orthogonal to the axial direction of the mandrel, wherein the at least one diametrically expandable annular rubber member 2 formed from a degradable rubber material is provided between the pair of rings 5 and 5'. Since the plug for well drilling of the present invention is provided with at least one diametrically expandable annular rubber member 2 and at least one slip 3 disposed on the outer circumferential surface orthogonal to the axial direction of the mandrel 1, it is possible to plug the space between the plug and the downhole and to fix the plug to the downhole. Since the plug for well drilling of the present invention is further provided with the pair of rings 5 and 5' described above, it is possible to efficiently apply a force in the axial direction of the mandrel 1 to the diametrically expandable annular rubber member 2 and/or the slip 3 disposed on the outer circumferential surface orthogonal to the axial direction of the mandrel 1, via the wedge 4 as desired. That is, by configuring the pair of rings 5 and 5' so that they can slide along the axial direction of the mandrel 1 on the outer circumferential surface of the mandrel 1 and so that the spacing (distance) therebetween can be changed, and configuring the pair of rings 5 and 5' so as to come into contact with the end parts of the diametrically expandable annular rubber member 2 and/or the slips 3 and 3' along the axial direction of the mandrel 1 directly or indirectly via the wedges 4 and 4' provided as desired, for example (as a combination of slips 3 and 3' and wedges 4 and 4' in FIG. 1), it is possible to easily apply a force in the axial direction of the mandrel 1 to these components.

The shape and size of each ring of the pair of rings 5 and 5' are not particularly limited as long as they fulfill the functions described above, but from the perspective of being able to effectively apply a force in the axial direction of the mandrel 1 to the diametrically expandable annular rubber member 2 and/or to the slips 3 and 3' via the wedges 4 and 4' as desired, the end surface of the rings on the side making contact with these components preferably has a flat shape. Each ring of the pair of rings 5 and 5' is preferably a circular ring which completely surrounds the outer circumferential surface of the mandrel 1, but it may also have breaks or deformed places in the circumferential direction. In addition, as for the shape in which the circle is separated in the circumferential direction, the circle may be formed as desired. As each of the rings of the pair of rings 5 and 5', a plurality of rings may be disposed adjacently in the axial direction so as to form a wide ring (with a long length in the axial direction of the mandrel 1). Additionally, rings that form the pair of rings 5 and 5' in the plug for well drilling of the present invention may include members that contribute to effectively applying a force in the axial direction of the mandrel 1 to the diametrically expandable annular rubber member 2 and/or to the slips 3 and 3' via the wedges 4 and 4' as desired.

The pair of rings 5 and 5' may have the same or similar shapes or structures, or the shapes or structures may be different. For example, each ring of the pair of rings 5 and 5' may differ in outside diameter or length in the axial direction of the mandrel 1. In addition, for example, one of the rings of the pair of rings 5 and 5' may be configured in a state in which it cannot slide relative to the mandrel 1, as desired. In this case, the other ring of the pair of rings 5 and 5' slides on the outer circumferential surface of the mandrel 1 to come into contact with the end part along the axial direction of the combination of the diametrically expandable annular rubber member 2 and/or the combination of slips 3 and 3' and wedges 4 and 4' disposed as desired. The configuration in which one of the rings of the pair of rings 5 and 5' cannot slide relative to the mandrel 1 as desired is not particularly limited, but, for example, the mandrel 1 and one ring of the pair of rings 5 and 5' may be formed integrally (in this case, the ring in question cannot slide relative to the mandrel 1), or a clutch structure such as a jaw clutch or a fitting structure may be used (in this case, it is possible to switch between a state in which the ring can slide relative to the mandrel 1 and a state in which the ring cannot slide relative to the mandrel 1). As a plug for well drilling in which the mandrel 1 and one of the rings of the pair of rings 5 and 5' are formed integrally, a plug for well drilling in which these components are formed by integral molding or a plug for well drilling formed by machining is provided.

Furthermore, the plug for well drilling of the present invention may be provided with a plurality of pairs of rings 5 and 5'. In this case, one or more of the diametrically expandable annular rubber member 2 and/or the combination of slips 3 and 3' disposed as desired and wedges 4 and 4' disposed as desired can be disposed at positions between the plurality of pairs of rings, each separately or in combinations.

[Degradable Material]

The material forming the pair of rings 5 and 5' is not particularly limited as long as a force in the axial direction of the mandrel 1 can be applied efficiently to the diametrically expandable annular rubber member 2 and/or the slip 3 via the wedge 4 as desired, but at least one of the rings (5 or 5') may also be formed from a degradable material. As the degradable material that forms at least one ring of the pair of rings 5 and 5', the same degradable materials as described above in regard to the mandrel 1 may be used. Therefore, the degradable material that forms at least one ring of the pair of rings 5 and 5' is preferably a degradable resin, more preferably an aliphatic polyester, and even more preferably a polyglycolic acid. The degradable material may be one that also contains a reinforcing material, particularly one formed from an aliphatic polyester containing a reinforcing material.

When both of the rings of the pair of rings 5 and 5' are formed from a degradable material, the types and compositions of the resin of the degradable material may be the same or different. When one of the pair of rings 5 and 5' is formed from a degradable material, a metal such as aluminum or iron or a composite material of a reinforced resin or the like can be used as the material for forming the other ring.

5. Plug for Well Drilling

The plug for well drilling of the present invention is a plug for well drilling comprising a mandrel and at least one diametrically expandable annular rubber member and at least one slip disposed on an outer circumferential surface orthogonal to an axial direction of the mandrel; (i) the mandrel being formed from a degradable material; and (ii) the at least one diametrically expandable annular rubber member having a rate of decrease of not less than 5% in 50% strain compressive stress after immersion in water at a temperature of 150° C. for 24 hours relative to a 50% strain compressive stress before immersion; and/or (ii') the at least one diametrically expandable annular rubber member being formed from a degradable rubber material having a rate of loss of mass of from 5 to 100% after immersion in water at a temperature of 150° C. for 72 hours relative to a mass before immersion. As described above, the plug for well drilling of the present invention may be provided with a wedge 4 to be combined with a slip 3, a pair of rings 5 and 5', and other members which may ordinarily be provided in plugs for well drilling. For example, when the mandrel 1 has a hollow part along the axial direction, a ball placed in the hollow part to control the flow of fluid (which may be formed from a material such as a metal or a resin and may be formed from a degradable material) may be provided. In addition, a member for linking or releasing the plug for well drilling and/or other members to and from each other or other members—for example, a rotation stopping member or the like—may be provided. The entire plug for well drilling of the present invention may also be formed from a degradable material.

[Borehole Plugging]

In the plug for well drilling of the present invention, by applying a force in the axial direction of the mandrel 1 to the pair of rings 5 and 5', for example, the force in the axial direction of the mandrel 1 is transmitted to the diametrically expandable annular rubber member 2, and as a result, the diametrically expandable annular rubber member 2 expands in diameter in a direction orthogonal to the axial direction of the mandrel 1 as the diametrically expandable annular rubber member 2 is compressed in the axial direction of the mandrel 1, and the distance in the axial direction is reduced (reduced in diameter). The annular rubber member 2 expands in diameter and the outward part in the direction orthogonal to the axial direction comes into contact with the inside wall H of the downhole, and additionally, the inward part in the direction orthogonal to the axial direction comes into contact with the outer circumferential surface of the mandrel 1, thereby plugging (sealing) the space between the plug and the borehole (borehole sealing). Fracturing can then be performed in the state in which the space between the plug and the borehole has been plugged (sealed). After fracturing has been completed, the diametrically expandable annular rubber member 2 remains inside the borehole in the diameter-expanded state, and by working together with the combination of the slips 3 and 3' and the wedges 4 and 4' provided as desired, it can fix the plug for well drilling at a prescribed position of the borehole. Furthermore, when the aforementioned plugging (sealing) or the like is performed in a downhole in a high-temperature environment in which the member of the plug for well drilling ends up degrading in a short time, a treatment method can be employed in which the seal performance (strength and the like) can be maintained for a desired time by controlling the ambient temperature of the plug for well drilling to a reduced state by injecting fluid from above ground (cooldown injection).

[Boring Plug Degradation]

When the fracturing of the prescribed sections has been completed, well drilling is ordinarily ended and the borehole is completed, and when the production of petroleum, natural gas, or the like is begun, at least the mandrel 1 and the diametrically expandable annular rubber member 2 of the plug for well drilling of the present invention—and additionally the pair of rings 5 and 5' or the like as desired—can be easily degraded and removed by biodegradation, hydrolysis, or chemical degradation by some other method. Accordingly, according to the plug for well drilling of the present invention, the substantial cost and time conventionally required to remove, recover, or destroy or fragmentize, by pulverization, perforation, or another method, many plugs for well drilling remaining inside a well after the completion of the well become unnecessary, which makes it possible to reduce the cost or steps of well drilling. Furthermore, it is preferable for the member of the plug for well drilling remaining after the well treatment to disappear completely by the time production is begun, but even if it does not disappear completely, as long as it is in a state that its strength decreases and it can be disintegrated by stimulation such as water flow in the downhole, the disintegrated member of the plug for well drilling can be easily recovered by flowback or the like, and since it does not cause clogging in the downhole or fractures, it does not hinder production of the petroleum, natural gas, or the like. Additionally, normally, the higher the downhole temperature, the shorter the time required for degradation and strength decrease of the member of the plug for well drilling. Furthermore, depending on the well, the moisture content in the subterranean formation is sometimes low, and in this case, the degradation of the plug for well drilling can be accelerated by allowing the water-based fluid used during fracturing to remain in the well without recovering it after fracturing.

In addition, when the plug for well drilling is one in which the difference between the time required for the thickness of the members formed from a degradable material (in addition to the mandrel 1, this includes at least one of the slip 3, the wedge 4, or the ring 5, or the like, as described above) to reach 0 in the well treatment fluid and the time required for the rate of decrease in the 50% strain compressive stress of the diametrically expandable annular rubber member 2 formed from a degradable rubber material after immersion in water at a temperature of 150° C. for 24 hours relative to the 50% strain compressive stress before immersion to be not less than 50% (also called "difference in degradation time" hereafter) is not less than 0 hours and not more than 2 weeks, the removal or disappearance of the plug for well drilling progresses almost simultaneously for many of the members forming the plug for well drilling together with the release of the plugging (seal) in downhole environments of various common temperatures such as a temperature of 163° C., 149° C., 121° C., 93° C., 80° C., or 66° C., which is preferable. It is sometimes advantageous for the value of the difference in degradation time to be small in that it is possible to reduce the time of the process, and the difference is more preferably not more than 7 days, even more preferably not more than 3 days, particularly preferably not more than 1 day, and most preferably not more than 12 hours or not more than 6 hours. A reduction in the difference in degradation time can be achieved by the selection of an optimal degradable material, the adjustment of the degradation rate (by using an additive capable of accelerating degradation or delaying degradation, or the like), the adjustment of the member thickness, or the like in the case of a member formed from a degradable material, and can be achieved by the selection of an optimal rubber member (optimization or the like of the type of rubber member or the molecular structure and/or the crosslinked structure of the rubber member), the adjustment of the degradation rate (by using an additive capable of accelerating degradation or delaying degradation, or the like), or the like in the case of the diametrically expandable annular rubber member 2. In particular, when the member formed from a degradable material is the mandrel 1, it is possible to make the mandrel 1 and the diametrically expandable annular rubber member 2 disappear almost simultaneously, which is preferable. Further, in the plug for well drilling, by using members formed from degradable materials for the mandrel 1 or other major members and setting the difference in degradation time to not less than 0 hours and not more than 2 weeks, practically all of the members disappear/disintegrate after a prescribed amount of time has passed, which is even more preferable. In addition, the measurement method for the time required for the thickness of a member formed from a degradable material to reach 0 (units: mm) and the time required for the rate of decrease in the 50% strain compressive stress of the diametrically expandable annular rubber member 2 formed from a degradable material after immersion in water at a temperature of 150° C. for 24 hours relative to the 50% strain compressive stress before immersion to be not less than 50% may be in accordance with the methods described with regard to the mandrel 1 and the diametrically expandable annular rubber member 2 above.

II. Boring Plug Production Method

The production method of the plug for well drilling of the present invention is not limited as long as the plug for well drilling comprising a mandrel, a diametrically expandable annular rubber member, and a slip described above can be produced. For example, each of the members provided in the plug for well drilling may be molded by injection molding, extrusion molding (including solidification-and-extrusion molding), centrifugal molding, compression molding, or other known molding method, and each of the obtained members may be subjected to machining such as cutting or perforation as necessary and then combined by known methods to obtain a plug for well drilling.

III. Well Drilling Method

With a well drilling method of isolating a borehole using the plug for well drilling of the present invention and then degrading part or all of the plug for well drilling, when the production of petroleum, natural gas, or the like is begun after the fracturing of the prescribed sections has been completed or the drilling of the well is ended and the well is complete, at least the mandrel and the diametrically expandable annular rubber member plugging the borehole— and additionally the slip plugging the borehole as desired— can be easily degraded and removed by biodegradation, hydrolysis, or chemical degradation by some other method. As a result, according to the well drilling method of the present invention, the substantial cost and time conventionally required to remove, recover, or destroy or fragmentize, by pulverization, perforation, or another method, many plugs for well drilling or members thereof remaining inside a well after the completion of the well become unnecessary, which makes it possible to reduce the cost or steps of well drilling.

INDUSTRIAL APPLICABILITY

The present invention provides a plug for well drilling comprising a mandrel and at least one diametrically expandable annular rubber member and at least one slip disposed on an outer circumferential surface orthogonal to an axial direction of the mandrel; (i) the mandrel being formed from a degradable material; and (ii) the at least one diametrically expandable annular rubber member having a rate of decrease of not less than 5% in 50% strain compressive stress after immersion in water at a temperature of 150° C. for 24 hours relative to a 50% strain compressive stress before immersion; and/or (ii') the at least one diametrically expandable annular rubber member being formed from a degradable rubber material having a rate of loss of mass of from 5 to 100% after immersion in water at a temperature of 150° C. for 72 hours relative to a mass before immersion. This yields high industrial applicability in that borehole plugging and fracturing can be performed reliably, under increasingly harsh excavation conditions such as increased depth, and the cost of well drilling can be reduced and the process can be shortened by facilitating the removal of the plug or the securement of a flow path.

In addition, the present invention provides a method comprising isolating a borehole using the plug for well drilling described above, part or all of the plug for well drilling being degraded thereafter. This yields high industrial applicability in that a well drilling method with which borehole plugging and fracturing can be performed reliably, and with which the cost of well drilling can be reduced and the process can be shortened by facilitating the removal of the plug or the securement of a flow path, is provided.

REFERENCE SIGNS LIST

1: Mandrel
2: Diametrically expandable annular rubber member
3, 3': Slips
4, 4': Wedges
5, 5': Rings
H: Inside wall of downhole (borehole)

The invention claimed is:

1. A plug for well drilling comprising:
   a mandrel;
   at least one diametrically expandable annular rubber member, and
   at least one slip;
   the at least one diametrically expandable annular rubber member and the at least one slip being disposed on an outer circumferential surface orthogonal to an axial direction of the mandrel;
   (i) the mandrel being formed from a biodegradable, hydrolysable, or chemically degradable resin; and
   (ii) the at least one diametrically expandable annular rubber member being formed from a degradable rubber material consisting essentially of a polyester-type thermosetting urethane rubber.

2. The plug for well drilling according to claim 1, wherein (ii') the at least one diametrically expandable annular rubber member is formed from a degradable rubber material having a rate of loss of mass of from 5 to 100% after immersion in water at a temperature of 150° C. for 72 hours relative to a mass before immersion.

3. A plug for well drilling comprising:
   a mandrel;
   at least one diametrically expandable annular rubber member, and
   at least one slip;
   wherein the at least one diametrically expandable annular rubber member and the at least one slip are disposed on an outer circumferential surface orthogonal to an axial direction of the mandrel;
   (i) the mandrel being formed from a biodegradable, hydrolysable, or chemically degradable resin; and
   (ii') the at least one diametrically expandable annular rubber member being formed from a degradable rubber material consisting essentially of a polyester-type thermosetting urethane rubber.

4. The plug for well drilling according to claim 1, wherein the at least one diametrically expandable annular rubber member is formed from a degradable rubber material having a tensile fracture strain of not less than 50% at a temperature of 66° C., a 70% strain compressive stress of not less than 10 MPa, and a compressive fracture strain of not less than 50%.

5. The plug for well drilling according to claim 1, wherein the at least one diameter expandable annular rubber member is stable in a dry environment, and a rate of decrease in 50% strain compressive stress after immersion for 6 hours in water at a temperature of 23° C. relative to a 50% strain compressive stress after immersion for 1 hour is less than 5%.

6. The plug for well drilling according to claim 1, wherein the at least one diameter expandable annular rubber member has a ratio of compressive stress at 70% compressive strain relative to a compressive stress at 5% compressive strain at a temperature of 66° C. is not less than 5.

7. The plug for well drilling according to claim 1, wherein the mandrel has a decrease in thickness of less than 5 mm after immersion in water at a temperature of 66° C. for 1 hour, and a decrease in thickness of not less than 10 mm after immersion in water at a temperature of 149° C. for 24 hours.

8. The plug for well drilling according to claim 1, wherein the mandrel is formed from a composite material containing a degradable resin which is biodegradable, hydrolysable, or chemically degradable.

9. The plug for well drilling according to claim 1, wherein the degradable rubber material contains a rubber having a hydrolyzable functional group.

10. The plug for well drilling according to claim 1, wherein the degradable rubber material contains a rubber having at least one bond comprising a urethane bond, an ester bond, or an amide bond.

11. The plug for well drilling according to claim 1, wherein the degradable resin contains an aliphatic polyester.

12. The plug for well drilling according to claim 11, wherein the aliphatic polyester is a polyglycolic acid.

13. The plug for well drilling according to claim 1, wherein the degradable resin and/or the degradable rubber material contains a reinforcing material.

14. The plug for well drilling according to claim 1 having at least one structure represented by a) to d) below:
   a) the mandrel has a hollow part along the axial direction in at least a part thereof or does not have a hollow part along the axial direction;
   b) the plug comprises a plurality of diametrically expandable annular rubber members formed from degradable rubber materials;
   c) the plug comprises at least one wedge disposed on the outer circumferential surface orthogonal to the axial direction of the mandrel; or
   d) the plug comprises a pair of rings disposed on the outer circumferential surface orthogonal to the axial direction of the mandrel, and the at least one diametrically expandable annular rubber member formed from a degradable rubber material is provided between the pair of rings.

15. The plug for well drilling according to claim 1, wherein in a well treatment fluid, a difference between a time required for a thickness of a member formed from a degradable resin, which is biodegradable, hydrolysable, or chemically degradable, to reach 0 and a time required for the rate of decrease in the 50% strain compressive stress of the diametrically expandable annular rubber member formed from a degradable rubber material after immersion in water at a temperature of 150° C. for 24 hours relative to the 50% strain compressive stress before immersion to be not less than 50% is not less than 0 hours and not more than 2 weeks.

16. The plug for well drilling according to claim 15, wherein the member formed from a degradable resin is a mandrel.

17. A well drilling method comprising a step of isolating a borehole using the plug for well drilling described in claim 1, part or all of the plug for well drilling being degraded thereafter.

* * * * *